(12) United States Patent
Galtarossa et al.

(10) Patent No.: US 6,920,270 B2
(45) Date of Patent: Jul. 19, 2005

(54) OPTICAL FIBRE WITH REDUCED POLARIZATION MODE DISPERSION AND METHOD FOR OBTAINING AN OPTICAL FIBRE WITH REDUCED POLARIZATION MODE DISPERSION

(75) Inventors: Andrea Galtarossa, Padua (IT); Anna Pizzinat, Conegliano (IT); Luca Palmieri, Padua (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 52 days.

(21) Appl. No.: 10/312,913

(22) PCT Filed: Jun. 27, 2001

(86) PCT No.: PCT/EP01/07241

§ 371 (c)(1),
(2), (4) Date: Jun. 23, 2003

(87) PCT Pub. No.: WO02/03115

PCT Pub. Date: Jan. 10, 2002

(65) Prior Publication Data

US 2004/0022507 A1 Feb. 5, 2004

Related U.S. Application Data

(60) Provisional application No. 60/218,057, filed on Jul. 13, 2000.

(51) Int. Cl.[7] ............................. G02B 6/17; C03B 37/02
(52) U.S. Cl. ......................... 385/123; 385/122; 65/475
(58) Field of Search ............................... 385/122–128; 65/475

(56) References Cited

U.S. PATENT DOCUMENTS

| 5,298,047 | A |   | 3/1994  | Hart, Jr. et al. |
| 5,418,881 | A |   | 5/1995  | Hart, Jr. et al. |
| 5,822,487 | A | * | 10/1998 | Evans et al. ................ 385/123 |
| 5,943,466 | A | * | 8/1999  | Henderson et al. ......... 385/123 |
| 5,992,181 | A |   | 11/1999 | Geertman |

FOREIGN PATENT DOCUMENTS

| EP | 0 582 405 A1 | 2/1994 |
| WO | WO 97/07067  | 2/1997 |
| WO | WO 97/26221  | 7/1997 |
| WO | WO 97/30945  | 8/1997 |
| WO | WO 99/67180  | 12/1999 |

OTHER PUBLICATIONS

Curti, F. et al., "Statistical Treatment of the Evolution of the Principal States of Polarization in Single–Mode Fibers," Journal of Lightwave Technology, vol. 8, No. 8, pp. 1162–1166, (Aug. 1990).

Heffner, B. L., "Attosecond–Resolution Measurement of Polarization Mode Dispersion in Short Sections of Optical Fiber," Optics Letters, vol. 18, No. 24, pp. 2102–2104, (Dec. 15, 1993).

(Continued)

*Primary Examiner*—Rodney Bovernick
*Assistant Examiner*—Juliana K. Kang
(74) *Attorney, Agent, or Firm*—Finnegan, Henderson, Farabow, Garrett & Dunner, L.L.P.

(57) ABSTRACT

A method for determining at least one parameter of a periodic spin function α(z) with period p, to be applied to an optical fiber along its length z during a drawing process. At least one parameter is selected so that (I) where $\epsilon_1$ is about 0.05 and $y_1$ is the first of the three components $y_1(z)$, $y_2(z)$, $y_3(z)$ of a periodic function y(z) of period p such that (II) where $L_B$ is an expected beat length of said optical fiber and α(z) is the derivative of the spin function α(z) with respect to the length z. The method is effective for substantially reducing the PMD of optical fibers drawn when applying a spin function.

28 Claims, 11 Drawing Sheets

OTHER PUBLICATIONS

Poole, C. D. et al., "Dynamical Equation for Polarization Dispersion," Optics Letters, vol. 16, No. 6, pp. 372–374, (Mar. 15, 1991).

Park, Y. et al., "Residual Stresses in a Doubly Clad Fiber with Depressed Inner Cladding(DIC)," Journal of Lightwave Technology, vol., 17, No. 10, pp. 1823–1834, (Oct. 1999).

Chowdhury, D. Q. et al., "Perturbation Model for Computing Optical Fiber Birefringence from a Two–Dimensional Refractive–Index Profile," Optics Letters, vol., 20, No. 19, pp. 1973–1975, (Oct. 1, 1995).

Chowdhury, D. et al., "Comparison Between Optical Fiber Birefringence Induced by Stress Anisotropy and Geometric Deformation," IEEE Journal of Selected Topics in Quantum Electronics, vol., 6, No. 2, pp. 227–232, (Mar./Apr. 2000).

Galtarossa, A. et al., "PMD Characterisation by Backscattered Field Polarisation Analysis," WFOPC 2000, pp. 176–187, (Jun. 8–9, 2000).

Thévenaz, L. et al., "Evaluation of Local Birefringence Along Fibres Using Brillouin Analysis," OFMC '97, $4^{TH}$ Optical Fibre Measurement Conference, pp. 82–85 (1997).

Marrone, M. J. et al., "Internal Rotation of the Birefringence Axes in Polarization–Holding Fibers," Optics Letters, vol. 12, No. 1, pp. 60–62, (Jan. 1987).

Corsi, F. et al., "Analytical Treatment of Polarization–Mode Dispersion in Single–Mode Fibers by Means of the Backscattered Signal, " J. Opt. Soc. Am. A, vol. 16, No. 3, pp. 574–583, (Mar. 1999).

Corsi, F. et al., "Beat Length Characterization Based on Backscattering Analysis in Randomly Perturbed Single–Mode Fibers," Journal of Lightwave Technology, vol. 17, No. 7, pp. 1172–1178, (Jul. 1999).

Wai, P. K. A. et al., "Polarization Mode Dispersion, Decorrelation, and Diffusion in Optical Fibers with Randomly Varying Birefringence," Journal of Lightwave Technology vol. 14, No. 2, pp. 148–157, (Feb. 1996).

* cited by examiner

OPTICAL FIBRE WITH REDUCED POLARIZATION MODE DISPERSION AND METHOD FOR OBTAINING AN OPTICAL FIBRE WITH REDUCED POLARIZATION MODE DISPERSION

CROSS REFERENCE TO RELATED APPLICATIONS

This application is a national phase application based on PCT/EP01/07241, filed Jun. 27, 2001, the content of which is incorporated herein by reference, and claims the priority of European Patent Application No. 00114559.8, filed Jul. 6, 2000, the content of which is incorporated herein by reference, and claims the benefit of U.S. Provisional Application No. 60/218,057, filed Jul. 13, 2000, the content of which is incorporated herein by reference.

BACKGROUND OF THE INVENTION

1. Field of the Invention

This invention relates to optical fibres, in particular to single mode optical fibres with reduced polarization mode dispersion (PMD). This invention also relates to a method for obtaining an optical fibre with reduced PMD.

The invention may apply to all kinds of optical fibres, as for example dispersion-unshifted fibres, dispersion-shifted fibres, non-zero-dispersion fibres, dispersion-compensating fibres, fibres for optical amplifiers (such as erbium doped fibres), fibres for optical sensors, fibres for gratings.

2. Related Art

It is well known that in the so called "single mode optical fibres", which are commonly used in optical telecommunication systems, two modes exist, with orthogonal polarizations.

If the fiber is perfectly circularly symmetric in both internal geometry and stress, the two polarization modes are degenerate and propagate with the same group velocity. That is, they have no relative time delay difference after traveling the same distance in the fibre.

In practical single mode fibres, however, various imperfections such as asymmetrical lateral stress and/or a non-circular core typically break the circular symmetry of the ideal modes. The two modes then propagate with different propagation constants ($k_1$ and $k_2$). The difference between the propagation constants is called "birefringence" ($\Delta\beta$): the magnitude of birefringence is given by the difference in the propagation constants of the two orthogonal modes:

$$\beta_1 = \Delta\beta = |k_1 - k_2| \quad (1)$$

Fibre birefringence can result from either a geometrical deformation and/or from various elasto-optic, magneto-optic and/or electro-optic refractive index changes. In so-called "polarization-preserving fibres" asymmetry is deliberately introduced into the fiber. However, in ordinary, non polarization-preserving fibres the birefringence causing mechanisms act on the fibre in a substantially unpredictable manner. Thus, the polarization state of the guided light will typically evolve through a random sequence of states along the fibre, with the polarization state at the fiber output typically being both unpredictable and unstable. On average, a given polarization state in a given fibre is reproduced after a certain length $L_B$, which is called the "beat length" associated with the given fibre. The fibre beat length is inversely proportional to the fiber birefringence and its value is given by $$L_B = 2\pi/\Delta\beta \quad (2)$$

Accordingly, the more the fiber is birefringent the shorter is the beat length and vice versa. Typical beat lengths observed in practice range from as short as 2–3 mm (high birefringence fibres) to as long as 10–100 m (low birefringence fibres). In addition to causing periodic changes in the polarization state of light traveling in a fiber, the presence of birefringence causes the two polarization modes to travel at different group velocities, the difference increasing as the birefringence increases. This effect is called "polarization mode dispersion" (PMD). The differential time delay $\Delta\tau$ between the two polarization modes will be referred herein and in the following as "differential group delay" (DGD). For a "short fibre section", that is, for a section which is short enough that any perturbations acting on it can be considered as constant over its length L, a PMD coefficient may be defined as the DGD for unit length $$PMD_C = \Delta\tau/L$$

and is usually expressed in units of picoseconds per kilometer of fibre length.

The expression "unperturbed fibre" will be used in the following interchangeably and with the same meaning of the expression "short fibre section".

In long fibre spans, for example in a span between two optical amplifiers, in an optical telecommunication system, DGD does not accumulate in a linear fashion. Rather, because of random variations in the perturbations along a fibre span, the effects of one section of a fibre span may either add to or subtract from the effect of another section. As a result, the DGD in long fibre spans accumulates in a random-walk like process that leads to a square root of length dependence.

An important parameter for distinguishing between the short length regime, where polarization effects are deterministic, and the long length regime, where they become statistical, is the "correlation length" $L_C$, which is often referred also as the "coupling length". One can imagine a large population of uniformly birefringent fibres, all subjected to the same random perturbations. Into each fibre of the population a lightwave is launched such that only one of the two polarization modes is excited at the input. As the lightwave propagates down the fiber, it initially remains in the starting polarization mode. Eventually, however, the state of polarization evolves away from the initial linear state as a result of power leaking over to the other polarization mode. This leakage of power (mode coupling) occurs because of variations in the birefringence along the fiber, caused by the random perturbations. If one were to average the amount of optical power that has leaked to the orthogonal state over all the fibres of the population, one would find that this average power grows with the distance from the input, until, at some large distance, the average power in the two polarization modes is approximately the same. The correlation length $L_C$ is defined as the length at which the average power in the orthogonal polarization mode, $P_\perp$, is within $1/e^2$ of the power in the starting mode, $P_\parallel$, i.e.

$$\frac{\langle P_\parallel(L_C)\rangle - \langle P_\perp(L_C)\rangle}{P_{total}} = \frac{1}{e^2}$$

It is remarked that the correlation length $L_C$ is extremely sensitive to the way in which the fibre is deployed, with values ranging from less than 1 m for a fiber on a spool, up to more than 1 km for cabled fibre.

PMD in conventional single mode fibres results in harmful signal distortion and is undesirable, especially for applications that involve high bit rates (e.g. equal to or greater than 10 Gbit/s) or analog transmission (e.g. for optical fibre analog CATV systems).

Various attempts to reduce the PMD coefficient in single mode optical fibres have been made. A known method of reducing the PMD coefficient involves spinning the preform during the fibre drawing process. The spinning causes the internal geometric and/or stress asymmetries of the fibre to rotate about the fibre's axis as one progresses down that axis. It is commonly believed that the reduction in PMD coefficient produced by spinning is proportional to the spin rate. Unfortunately, very high spin rates are generally required to deal with the asymmetries of typical fibres, e.g. spin rates greater than 5000 rpm. Spinning a preform at such rates is not a practical solution for commercial fibre production.

U.S. Pat. No. 5,298,047 and U.S. Pat. No. 5,418,881 to AT&T Bell Laboratories disclose that PMD can be substantially reduced if, during drawing of the fibre, a torque is applied to the fibre such that a permanent "spin" is impressed on the fibre. The torque is applied such that the spin impressed on the fibre has not constant spatial frequency, e.g., has alternately clockwise and counterclockwise helicity.

WO 97/26221 to Corning Incorporated discloses a method for reducing PMD in single mode fibres by spinning the fibre during the drawing process in accordance with a spin function having sufficient harmonic content. Examples of suitable spin functions disclosed are frequency modulated and amplitude modulated sine waves. According to the above WO patent application, the spin rate should vary both in magnitude and spatial distribution along the length of the fiber to achieve an optimum PMD reduction. When so varied, the spinning achieves transfer of energy between polarization modes (mode coupling) for a variety of beat lenghts.

The inventors have observed that by spinning the fiber using the amplitude or frequency modulated spin functions of the above WO patent application the correlation length $L_C$ of the fiber is reduced. As it is known (see, for example, F. Curti et al., "Statistical treatment of the evolution of the principal states of polarization in single-mode fibers" IEEE J. Lightwave Tech., vol. 8, pp. 1162–1166, 1990), in the long length regime (that is, when the length of the fibre L is much longer than $L_C$) the mean value of the DGD is proportional to the square root of the correlation length: thus, a reduction of $L_C$ leads to a reduction of the DGD, but only with a square root dependence. This result is not completely satisfactory.

SUMMARY OF THE INVENTION

The inventors have found that particular spin functions, characterized by definite values of their parameters (e.g., amplitude and/or period), applied to an optical fibre, allow to obtain a substantially periodic evolution of the DGD along at least a short section of the spun optical fiber. In particular, the substantially periodic evolution of the DGD may take place around very low mean values of DGD, down to values of the order of $10^{-3}$ ps or lower after 100 m of optical fibre.

Applicant remarks that methods of measurements of the DGD even after a short section of optical fibre have been proposed. See, for example, B. L. Heffner, "Attosecond-resolution measurement of polarization mode dispersion in short sections of optical fiber", Optics Letters, Vol. 18, No. 24, pp. 2102–2104, 1993.

The inventors have also found that a substantially periodic evolution of the DGD along a short section of an optical fiber is advantageous, as it allows to significantly reduce the PMD coefficient of an optical fibre of arbitrary length, down to values of 0.05 ps/km$^{1/2}$ or lower. Advantageously, the obtained PMD coefficient can be lower than 0.02 ps/km$^{1/2}$.

The inventors have also found mathematical conditions that allow to calculate the values of the parameters of a spin function to be applied to an optical fibre during the drawing process, in order to obtain a substantially periodic DGD evolution along at least a short section of the spun optical fibre.

According to a first aspect, the invention relates to a method for determining at least one parameter of a periodic spin function $\alpha(z)$ with period p, to be applied to an optical fibre along its length z, characterized in that it comprises selecting said at least one parameter so that $$\frac{\left|\int_0^p y_1(z, \alpha'(z))dz\right|}{\int_0^p |y_1(z, \alpha'(z))|dz} \leq \varepsilon_1$$

where $\varepsilon_1$ is about 0.05 and $y_1$ is the first of the three components $y_1(z), y_2(z), y_3(z)$ of a periodic function $\bar{y}(z)$ of period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

where $L_B$ is an expected beat length of said optical fibre and $\alpha'(z)$ is the derivative of the spin function $\alpha(z)$ with respect to the length z.

Preferably, $\varepsilon_1$ is about 0.01. More preferably, $\varepsilon_1$ is about 0.008. Even more preferably, $\varepsilon_1$ is about 0.002.

According to a second aspect, the invention relates to a method for making an optical fibre comprising:
(a) heating a fibre preform to a drawing temperature;
(b) providing a periodic spin function $\alpha(z)$ with period p>2 m; and
(c) drawing said optical fibre from said preform, while simultaneously creating a relative spin between said optical fibre and said preform with said spin function;
characterized in that
step (b) further comprises selecting said spin function so that $$\frac{\left|\int_0^p y_1(z, \alpha'(z))dz\right|}{\int_0^p |y_1(z, \alpha'(z))|dz} \leq \varepsilon_1$$

where $\varepsilon_1$ is about 0.05 and $y_1$ is the first of the three components $y_1(z), y_2(z), y_3(z)$ of a periodic function $\bar{y}(z)$ of period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

where $L_B$ is an expected beat length of said optical fibre and $\alpha'(z)$ is the derivative of the spin function $\alpha(z)$ with respect to the length z.

Preferably, $\epsilon_1$ is about 0.01. More preferably, $\epsilon_1$ is about 0.008. Even more preferably, $\epsilon_1$ is about 0.002.

Advantageously, $p<L_B$. Typically, p is lower than 20 m. Preferably $L_B$ is greater than 0.5 m, more preferably greater than 5 m.

Advantageously, an amplitude A of said spin function is lower than 50 turns/m, preferably lower than 10 turns/m. Preferably, A is greater than 3 turns/m.

Preferably, a ratio between an amplitude A and a distance r between two inversion sites of said spin function is lower than 10 turns/m$^2$.

According to different embodiments, said spin function can be a sinusoidal function, a triangular function, or a trapezoidal function.

Typically, the step of drawing is performed at a drawing speed not lower than 5 m/s.

According to a third aspect, the invention relates to a method for making an optical fibre having $NA \geq 0.2$ comprising:
(a) heating a fibre preform to a drawing temperature;
(b) providing a periodic spin function $\alpha(z)$ with period p; and
(c) drawing said optical fibre from said preform, while simultaneously creating a relative spin between said optical fibre and said preform with said spin function;
characterized in that
step (b) further comprises selecting said spin function so that $$\frac{\left|\int_0^p y_1(z, \alpha'(z))dz\right|}{\int_0^p |y_1(z, \alpha'(z))|dz} \leq \varepsilon_1$$

where $\epsilon_1$ is about 0.05 and $y_1$ is the first of the three components $y_1(z)$, $y_2(z)$, $y_3(z)$ of a periodic function $\bar{y}(z)$ of period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

where $L_B$ is an expected beat length of said optical fibre and $\alpha'(z)$ is the derivative of the spin function $\alpha(z)$ with respect to the length z.

Preferably, $\epsilon_1$ is about 0.01. More preferably, $\epsilon_1$ is about 0.008. Even more preferably, $\epsilon_1$ is about 0.002.

Advantageously, $p<L_B$. Preferably $L_B$ is lower than 5 m.

According to different embodiments, said spin function can be a sinusoidal function, a triangular function, or a trapezoidal function.

According to a fourth aspect, the invention relates to an optical fibre comprising at least a section having a beat length $L_B$ and a periodic spin function $\alpha(z)$ with period $p>2$ m impressed therein,
characterized in that
said spin function is such that $$\frac{\left|\int_0^p y_1(z, \alpha'(z))dz\right|}{\int_0^p |y_1(z, \alpha'(z))|dz} \leq \varepsilon_1$$

where $\epsilon_1$ is about 0.05 and $y_1$ is the first of the three components $y_1(z)$, $y_2(z)$, $y_3(z)$ of a periodic function $\bar{y}(z)$ of period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

and $\alpha'(z)$ is the derivative of the spin function $\alpha(z)$ with respect to the length z.

Preferably, $\epsilon_1$ is about 0.01. More preferably, $\epsilon_1$ is about 0.008. Even more preferably, $\epsilon_1$ is about 0.002.

Advantageously, $p<L_B$. Typically, p is lower than 20 m. Preferably $L_B$ is greater than 0.5 m, more preferably greater than 5 m.

Advantageously, an amplitude A of said spin function is lower than 50 turns/m, preferably lower than 10 turns/m. Preferably, A is greater than 3 turns/m.

Preferably, a ratio between an amplitude A and a distance r between two inversion sites of said spin function is lower than 10 turns/m$^2$.

According to different embodiments, said spin function can be a sinusoidal function, a triangular function, or a trapezoidal function.

Preferably, said optical fibre has a PMD coefficient lower than or equal to 0.05 ps/km$^{1/2}$.

Preferably, a length of said section of optical fibre is higher than or equal to 10 times the period p of the spin function.

According to a fifth aspect, the invention relates to an optical fibre having $NA \geq 0.2$, comprising at least a section having a beat length $L_B$ and a periodic spin function $\alpha(z)$ with period p impressed therein,
characterized in that
said spin function is such that $$\frac{\left|\int_0^p y_1(z, \alpha'(z))dz\right|}{\int_0^p |y_1(z, \alpha'(z))|dz} \leq \varepsilon_1$$

where $\epsilon_1$ is about 0.05 and $y_1$ is the first of the three components $y_1(z)$, $y_2(z)$, $y_3(z)$ of a periodic function $\bar{y}(z)$ of period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

and $\alpha'(z)$ is the derivative of the spin function $\alpha(z)$ with respect to the length z.

Preferably, $\epsilon_1$ is about 0.01. More preferably, $\epsilon_1$ is about 0.008. Even more preferably, $\epsilon_1$ is about 0.002.

Advantageously, $p<L_B$. Preferably $L_B$ is lower than 5 m.

According to different embodiments, said spin function can be a sinusoidal function, a triangular function, or a trapezoidal function.

According to a sixth aspect, the invention relates to an optical fibre having a length lower than 1 km, comprising at least a section having a beat length $L_B$ and a periodic spin function $\alpha(z)$ with period p impressed therein, characterized in that
said spin function is such that $$\frac{\left|\int_0^p y_1(z, \alpha'(z))dz\right|}{\int_0^p |y_1(z, \alpha'(z))|dz} \leq \varepsilon_1$$

where $\varepsilon_1$ is about 0.05 and $y_1$ is the first of the three components $y_1(z)$, $y_2(z)$, $y_3(z)$ of a periodic function $\bar{y}(z)$ of period p such that $$\frac{dy_1}{dz} = 2\alpha'(z)y_2$$
$$\frac{dy_2}{dz} = -\frac{2\pi}{L_B}y_3 - 2\alpha'(z)y_1$$
$$\frac{dy_3}{dz} = \frac{2\pi}{L_B}y_2$$

and $\alpha'(z)$ is the derivative of the spin function $\alpha(z)$ with respect to the length z.

Preferably, $\varepsilon_1$ is about 0.01. More preferably, $\varepsilon_1$ is about 0.008. Even more preferably, $\varepsilon_1$ is about 0.002.

Advantageously, $p<L_B$. Preferably, said fibre length is lower than 500 m, more preferably lower than 200 m.

According to different embodiments, said spin function can be a sinusoidal function, a triangular function, or a trapezoidal function.

According to a seventh aspect, the invention relates to an optical telecommunication system comprising:
an optical transmission line,
at least one transmitter for adding a signal to said transmission line,
at least one receiver for receiving said signal from said transmission line,
characterized in that
said transmission line comprises at least one optical fibre according to the fourth aspect of the invention.

According to an eigth aspect, the invention relates to an article comprising at least one optical fibre according to any one of the fourth, fifth and sixth aspects of the invention.

BRIEF DESCRIPTION OF THE DRAWINGS

The advantages of the invention will be apparent upon consideration of the following detailed description, taken in conjunction with the accompanying drawings, in which.

DETAILED DESCRIPTION OF THE INVENTION

Figure 1:
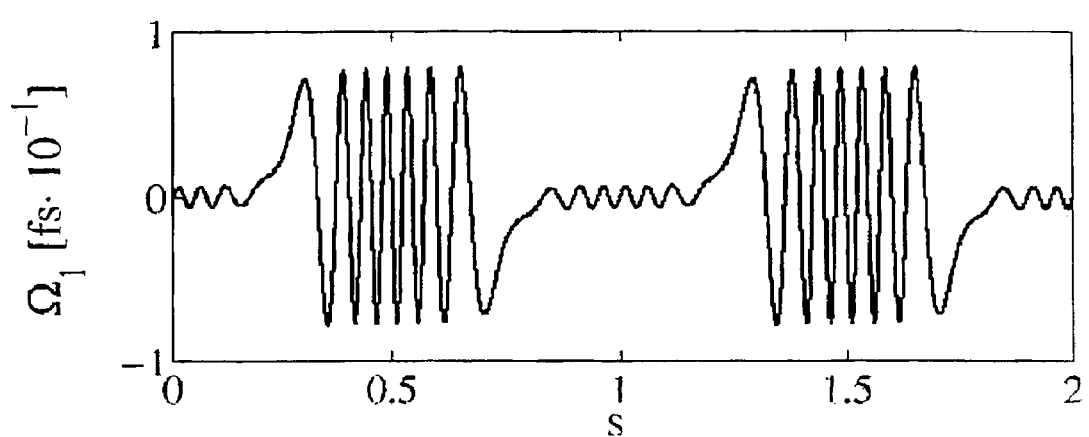
FIG. 1 shows an evaluation of the periodic evolution of the first component of the polarization dispersion vector in a short section of an optical fibre spinned with an example of sinusoidal function according to the invention.

For studying the evolution of the DGD along a birefringent optical fibre, it is convenient to study the evolution of the polarization dispersion vector (PDV) $\bar{\Omega}_f(z,\omega)$ along an optical fibre. Herein and in the following, the sign over a quantity indicates a vector quantity. The PDV is parallel to the output principal states of polarization and its modulus is equal to the DGD. The evolution of the PDV, as a function of a distance z along the fibre and as a function of the frequency $\omega$ of an optical signal launched in the fibre, is governed by the dynamical equation (see C. D. Poole et al., "*Dynamical equation for polarization dispersion*". Optics Letters, vol. 6, pp. 372–374, 1991):

$$\frac{\partial \bar{\Omega}_f(z,\omega)}{\partial z} = \frac{\partial \bar{\beta}_f(z,\omega)}{\partial \omega} + \bar{\beta}_f(z,\omega) \times \bar{\Omega}_f(z,\omega) \quad (3)$$

where $\bar{\beta}_f(z,\omega)$ is the local birefringence vector. For studying the evolution of the PDV along a short section of unperturbed fibre, it can be assumed that the unspun fibre is affected by a linear, z-independent birefringence of magnitude $\beta_l(\omega)=2\pi/L_B$, then the local birefringence vector of the spun fibre can be written as $$\bar{\beta}_f(z,\omega) = \beta_l(\omega)\begin{pmatrix} \cos(2\alpha) \\ \sin(2\alpha) \\ 0 \end{pmatrix} \quad (4)$$

where $\alpha=\alpha(z)$ is a generic spin function. In this case, the inventors have observed that analytical treatment of the equation describing evolution of PDV can be simplified by transforming it in a reference frame rotating along z as twice the spin function. In the new reference frame, the birefringence vector results $$\bar{\beta}(z,\omega) = \begin{pmatrix} \beta_l(\omega) \\ 0 \\ -2\alpha'(z) \end{pmatrix} \quad (5)$$

where $\alpha'(z)$ represents the derivative with respect to the distance z of the spin function $\alpha$. Generally, in the following of the description, a primed quantity (e.g., $\alpha'$) will indicate the derivative with respect to the distance z of the same. It has to be noted that the spin function $\alpha$ is measured in radians, while $\alpha'$ is the effective spin rate, measured in radians per meter. In the new reference frame, the differential equation of the PDV becomes $$\frac{\partial \Omega_1}{\partial z} = \beta_\omega + 2\alpha' \Omega_2 \quad (6)$$
$$\frac{\partial \Omega_2}{\partial z} = -\beta_l \Omega_3 - 2\alpha' \Omega_1$$
$$\frac{\partial \Omega_3}{\partial z} = \beta_l \Omega_2$$

where $\beta_\omega = d\beta_l/d\omega$ and where $\Omega_i(i=1, 2, 3)$ are the components of the PDV in the new reference frame. As the modulus of a vector does not change when the vector undergoes a rotation, the DGD is independent of the reference frame and it holds $$\Delta\tau = |\bar{\Omega}| = |\bar{\Omega}_f|.$$

Equation (6) can be analitically solved in the case of constant spin rate, that is $\alpha(z)=\alpha_0 z$, and the DGD reads as $$\Delta\tau(z) = \frac{\beta_\omega}{\beta} \sqrt{\beta_l^2 z^2 + \left(\frac{4\alpha_0}{\beta}\sin\left(\frac{\beta z}{2}\right)\right)^2} \quad (7)$$

where $\beta=\sqrt{\beta_l^2+4\alpha_0^2}$. Unfortunately, the analytical solution of equation (6) with a generic spin rate cannot be found. However, the inventors have observed that it is possible to express $\Delta\tau$ as a function of only the first component of PDV. Actually it results $$\Delta\tau'(z) = \frac{\bar{\Omega}(z)\cdot\bar{\Omega}'(z)}{\Delta\tau(z)}$$

which, using equations (6) can be integrated, yelding:

$$\Delta\tau(z) = \left(2\beta_\omega \int_0^z \Omega_1(l)dl\right)^{1/2} \quad (8)$$

In the case of constant spin rate (see (7)), and omitting the oscillating term, the DGD increases linearly with the distance. On the other hand, the inventors have observed that if the first component of PDV, $\Omega_1(z)$, is a periodic function (see (8)), then the DGD grows at most with the square root of distance; further, if the average value of the first component of PDV $\Omega_1(z)$ over a period is zero, then also the DGD is periodic. In the following, a function having average value over a period equal to zero will be referred to as a function having zero mean.

The inventors have understood that a periodic evolution of the DGD along the unperturbed fibre is advantageous, since it can result in a limited, very low DGD, and mainly it is independent on the fibre length. The inventors have also perceived that a periodic evolution of the DGD along a short section of unperturbed fibre allows to obtain a very low PMD coefficient of the optical fibre, even if polarization mode coupling is introduced along the fibre.

In the light of these considerations, the inventors have faced the problem of finding a periodic spin rate function with period p such that equation (6) had a periodic solution with period p.

By introducing the following transformations $$\Omega_i = \frac{\beta_\omega}{\beta_l} x_i,$$

$$2\alpha'(z)=\beta_1\gamma(z),\, y=\beta_1 z$$

it is possible to write the equation system (6) in adimensional form $$\frac{d\bar{x}}{ds} = A(s)\bar{x}(s) + \bar{u} \quad (9)$$
$$= \begin{pmatrix} 0 & \gamma(s) & 0 \\ -\gamma(s) & 0 & -1 \\ 0 & 1 & 0 \end{pmatrix}\bar{x}(s) + \begin{pmatrix} 1 \\ 0 \\ 0 \end{pmatrix}$$

It has to be noticed that if $\alpha(z)$ is p-periodic, then also $\gamma(s)$ shows periodicity with a normalized period $\chi=p\beta_1$ in the adimensional reference frame.

When the spin-rate $\alpha'$(or $\gamma$) is a periodic function, the equation (9) represents an inhomogeneous linear system with periodic coefficients. This kind of system has been already studied in literature, and a complete theory about it has been developed, giving the guidelines for the solution of such differential equation. In particular, according to the theory of the linear systems it may be shown that the behaviour of the inhomogeneous system (9) depends on that of the corresponding homogeneous system.

Thus, let us consider the homogeneous system corresponding to equations (9)

$$\frac{d\bar{y}}{ds} = A(s)\bar{y}(s) = \begin{pmatrix} 1 \\ 0 \\ -\gamma(s) \end{pmatrix} \times \bar{y}(s) \quad (10)$$

The general solution of this equation can be always written as $\bar{y}(s)=X(\bar{v}(s))\bar{y}(0)$, where $X(\bar{v}(s))$ is said "transition matrix" and, in this case, represents a rotation matrix around a suitable vector $\bar{v}(s)$, through an angle equal to $|\bar{v}(s)|$.

It can be shown that equation (10) has a $\chi$-periodic solution if and only if the matrix $X(\bar{v}(\chi))$ has a unit eigenvalue and, if this is the case, the $\chi$-periodic solution is obtained by setting the initial condition, $\bar{y}(0)$, equal to the corresponding eigenvector. For rotation matrices this is indeed the case.

Since the homogeneous system (10) has at least one χ-periodic solution, it can be shown that the inhomogeneous system (9) has χ-periodic solutions if and only if the following condition is satisfied $$\frac{1}{\chi}\int_0^\chi y_1(s)\,ds = 0 \qquad (11)$$

where $y_1(s)$ is the first component of the χ-periodic solution of the homogeneous system (10).

In the previous reference frame (the same of the above equations (5) and (6)), equation (11) can be re-written as $$\frac{1}{p}\int_0^p y_1(z, \alpha'(z))\,dz = 0 \qquad (11')$$

where $y_1(z,\alpha'(z))$ is the first component of a vector $\bar{y}(z,\alpha'(z))$, p-periodic solution of the homogeneous system $$\frac{dy_1}{dz} = 2\alpha'(z)y_2 \qquad (10')$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

The above condition (11') is actually a condition on the p-periodic spin rate function α': as explained before, if such condition is satisfied, then the PDV is periodic and the DGD grows at most with the square root of distance.

If the first component of the PDV vector has zero mean, the DGD itself is periodic. The inventors have determined that the first component of the periodic solution of the inhomogeneous system (9) has zero mean if the following condition is satisfied:

$$\frac{1}{\chi}\int_0^\chi X^T(s)\bar{u}\,ds = \bar{0} \qquad (12)$$

where X is the above mentioned transition matrix, $X^T$ indicates the transpose of the matrix, $\bar{u}=(1,0,0)^\tau$ was defined in equation (9) and $\bar{0}=(0,0,0)^T$. The above condition (12) is actually a second condition on the p-periodic spin rate function α'.

In the previous reference frame, equation (12) can be re-written as $$\frac{1}{p}\int_0^p X^T(z, \alpha'(z))\begin{pmatrix}\beta_\omega \\ 0 \\ 0\end{pmatrix}dz = \bar{0} \qquad (12')$$

where the transition matrix X satisfies the following system $$\frac{dX}{dz} = \begin{pmatrix} 0 & 2\alpha'(z) & 0 \\ -2\alpha'(z) & 0 & -2\pi/L_B \\ 0 & 2\pi/L_B & 0 \end{pmatrix}X(z)$$

According to the above, by means of condition (11') one can find the "optimum parameters" of a spin rate function (such as, for example, the amplitude of the function) that allow to obtain a DGD function which grows at most with the square root of the distance. Further, by means of condition (12') one can find the "optimum parameters" of the spin rate function that allow to obtain a DGD function which is periodic.

The general solution of the homogeneous system (10') cannot be written explicitly. Further, it wasn't possible to find analytical conditions for any given spin profile, except for some kind of spin profiles, as it will be explained in the following of the description. Nevertheless, it is still possible to determine the optimum spin parameters through a numerical method. In fact, introducing any generic spinning profile in the birefringence vector, the homogeneous system (10') can be numerically solved, and optimum spinning parameters can be modified in an iterative way, until condition (11') and possibly condition (12') are satisfied. The numerical method can be carried out by using conventional techniques that are well known in the art. For example, the analysis can be performed using the commercially available MATLAB™ software. By means of the numerical method, it is clearly possible to verify the periodic evolution of the PDV and of the DGD along a simulated unperturbed fibre spun with the optimum spin function, by plotting the PDV and/or the DGD versus the distance z, for at least one period p of the spin function. By applying this method, the inventors have verified that a periodic evolution of the DGD along a fibre is actually advantageous for obtaining very low values of the DGD and of the PMD coefficient of the fibre.

From a practical point of view, the inventors have found that a substantial reduction of the DGD of the spun fibre can be also obtained by setting the parameters of the spin function α(z) so as to be "less than optimum". As the "optimum parameters" are determined by equating to zero the integral function in the left hand side of equality (11'), a range of "less than optimum parameters", useful for obtaining a very low DGD of the fibre, can be obtained by keeping sufficiently near to zero the value of the same integral function. In this respect, equality (11') can be substituted by the inequality $$I_1 \leq \epsilon_1 \qquad (11'')$$

where $I_1$ is an adimensional integral function defined as $$I_1 = \frac{\left|\int_0^p y_1(z, \alpha'(z))\,dz\right|}{\int_0^p |y_1(z, \alpha'(z))|\,dz}$$

and $\epsilon_1$ represents a sufficiently small value. The inventors have determined that in order to obtain a range of "less than optimum parameters" of a spin function useful for obtaining very low values of DGD, the value of $\epsilon_1$ in the inequality (11'') should be set to about 0.05.

Preferably $I_1$ should be lower than or equal to about 0.01, more preferably lower than or equal to about 0.008. Further, the inventors have verified that by choosing different spin functions having parameters comprised in a range such that the function $I_1$ becomes lower than about 0.002, no evident difference in the DGD evolution is obtained. In other words, the value zero in the right hand side of equality (11') practically corresponds to values lower than about 0.002.

Furthermore, despite the inventors have not been able to prove it analytically for all the possible spin functions α(z), they believe that condition (11') actually is sufficient for obtaining a periodic evolution of the DGD along the unperturbed fibre: in particular, a series of numerical simulations performed by the inventors with different spin functions have shown that if the parameters of the spin function are determined so that condition (11') is satisfied, then also condition (12') results to be satisfied. As condition (11') can be seen as a condition for obtaining a periodic DGD evolution along a short section of optical fibre, condition (11''), together with the above specified values of $\epsilon_1$, can be seen as a condition for obtaining a substantially periodic DGD along a short section of optical fibre.

The inventors have also verified that when inequality (11") is satisfied, a second inequality (12") results to be satisfied, that is $$\frac{\left|\int_0^p W(z, \alpha'(z))\,dz\right|}{\int_0^p |W(z, \alpha'(z))|\,dz} \leq \varepsilon_2 \quad (12")$$

where the vector $W(z,\alpha'(z))$ is defined as $$W(z, \alpha'(z)) = X^T(z, \alpha'(z)) \begin{pmatrix} \beta_\omega \\ 0 \\ 0 \end{pmatrix}$$

and $\epsilon_2$ is a second sufficiently small value. In the ranges of $\epsilon_1$ above specified, the value $\epsilon_2$, in general, results to be lower than about 0.05.

It may be convenient to re-write inequality (12") as $$I_2 \leq \epsilon_2 \quad (12")$$

where $I_2$ is an adimensional integral function defined as $$I_2 = \frac{\left|\int_0^p W(z, \alpha'(z))\,dz\right|}{\int_0^p |W(z, \alpha'(z))|\,dz}$$

More particularly, the inventors have observed that the functions $I_1$ and $I_2$ above defined, calculated versus one of the parameters of a spin function, with the other parameters independently fixed, have a behaviour with local maxima and minima. The minima reach very small values in correspondence of well localized values of the chosen parameter and thus allow to find the optimum spinning. On the other hand, the height of the maxima may vary if the function is plotted in a wide range of values of the chosen parameter. Being M a local maximum of the function $I_1$ (corresponding to a non zero value of the chosen parameter), a practical local minimum condition (or "less than optimum" condition) can be determined by finding the range of parameters such that $I_1$ is lower than or equal to about M/2, preferably lower than or equal to M/4.

In order to qualitatively verify the evolution of the DGD along a simulated unperturbed fibre spun with a spin function determined according to inequality (11"), one can plot the DGD versus the distance z, for at least one period p of the spin function. In this way, the substantially periodic evolution of the DGD can be checked.

From a quantitative point of view, however, in order to understand if the spin function determined by the above method is effective in reducing the DGD, one can plot the DGD versus the distance z for a longer section of unperturbed optical fibre, for example on a section of a length comprised between 10 and 100 times the period p of the spin function (that is, in general, along a "short fibre section" as defined above).

The inventors have verified that the DGD value reached after a short section of unperturbed fibre spun with the optimum parameters may reach values that are at least two orders of magnitude lower than the DGD value reached in a section of unspun optical fibre having the same length. The inventors have also verified that with a spin function satisfying (11") it is possible to obtain DGD values about twenty times lower than the DGD of a corresponding unspun fibre.

Furthermore, the inventors have verified that the spinning with the optimum parameters allows to obtain optical fibres that have a DGD lower than one order of magnitude with respect to a "generic" spinning. The effect of a "generic" spinning can be evaluated by finding the parameters of a spin function that lead to a local maximum of the function $I_1$, defined above, situated between two minima of the same function: this corresponds to the worst case with respect to the "optimized" one.

Generally, the solution of the homogeneous system (10') depends on the beat length $L_B$ of the optical fibre: thus, the parameters of the spin function would, in principle, depend on the beat length. In a commercial production of optical fibres of the same type, that is, having substantially the same refractive index profile and made by the same production process, an expected beat length can be generally determined, before the drawing of the optical fibre, in a statistical way. For example, the core ellipticity may be measured for a great number of preforms; then, a section of unspun optical fibre may be drawn from said preforms and the DGD may be measured in unperturbed conditions, that is, by avoiding as much as possible mode coupling in the fibre: this can be done by avoiding stress in the fibre due to bends, tension and/or crossings. For example, one km of fibre can be drawn from the preform and wound at zero tension and without crossings over a bobbin having a diameter of not less than 200 mm. A method of measurement of the DGD even after a short section of optical fibre has been proposed, for example, in the already cited B. L. Heffner, "*Attosecond-resolution measurement of polarization mode dispersion in short sections of optical fiber*", Optics Letters, Vol. 18, No. 24, pp. 2102–2104, 1993.

In such manner, as the DGD of an unperturbed unspun fibre and the birefringence of the fibre itself are linearly related, an empirical relation between the measured, core preform ellipticity and an expected beat length may be found.

This approximate method for predetermining an expected beat length from the core preform ellipticity can be sufficient in practice for finding the parameters of the spin function according to the above. Moreover, the inventors have found that the variability of the optimum parameters with respect to the beat length is in general sufficiently small.

Alternatively, some models for predetermining the birefringence of a fibre having certain refractive index profiles have been proposed. See, for example: Y. Park et al., "*Residual Stresses in a Doubly Clad Fiber with Depressed Inner Cladding*", Journal of Lightwave Technology, Vol. 17, No. 10, pp. 1823–1834, 1999; D. Q. Chowdhury, D. A. Nolan, "*Perturbation model for computing optical fibre birefringence from a two-dimensional refractive-index profile*". Optics Letters, Vol. 20, No. 19, pp. 1973–1975, 1995; D. Chowdhury, D. Wilcox, "*Comparison Between Optical Fiber Birefringence Induced by Stress Anisotropy and Geometric Deformation*". IEEE Journal of Selected Topics in Quantum Electronics, Vol. 6, No. 2, pp. 227–232, 2000. The models described in the above articles may be applied for predetermining the beat length.

On the other hand, the beat length of an optical fibre may be measured with known methods. See, for example, A. Galtarossa et al., "*PMD Characterization by Backscattered Field Polarisation Analysis*". WFOPC 2000, Jun. 8–9, 2000, Pavia, Italy, pp. 176–187; L. Thévenaz et al., "*Evaluation of local birefringence along fibres using Brillouin analysis*". OFMC '97, 4th Optical Fibre Measurements

*Conference*, pp. 82–85. In this respect, the inventors remark that the beat length of an optical fibre is independent from the spinning process, as it depends only on the birefringence of the fibre.

The inventors have found that a substantially periodic evolution of the DGD along a short section of optical fibre is advantageous, as the PMD coefficient of an arbitrary length of the optical fibre is greatly reduced. In general, with the optimum spin parameters, a reduction of about two orders of magnitude of the PMD coefficient of the fibre can be reached with respect to the PMD coefficient of the unspun fibre. In particular, the longer the beat length of the optical fibre, the lower the PMD coefficient that can be obtained. Preferably the beat length of the optical fibre should be longer than 0.5 m. More preferably, the beat length should be longer than 5 m.

The inventors have also found that the amplitude of the DGD oscillations decrease for decreasing period of the spin function. Preferably, the period p of the spin function should be shorter than 20 m.

On the other hand, it has to be observed that a spin function having a too short period may be difficult to be transferred on the fibre, in particular when a high drawing speed (at least 5–10 m/s) is required. This is the case, for example, of the fibres currently used in telecommunication systems (such as dispersion-unshifted fibres, non-zero-dispersion fibres, dispersion-shifted fibres). With high drawing speed and small period of the spin function, there can be technological limitations due to the fact that the frequency of inversion of the motion of the spinning apparatus cannot be too high. Preferably, in order to keep a drawing speed of at least 5–10 m/s the period of the spin function should be higher than 2 m. Periods of the spin function lower than 2 m could lead to a bad transfer of the spin function to the fibre at high drawing speed, due to possible sliding of the fibre itself on the spinning apparatus.

Instead, special fibres are not generally drawn at high speed, so the period of the spin function can be lowered accordingly. Examples of special fibres are: doped fibres for optical amplifiers, dispersion compensating fibres, fibres for gratings, fibres for optical sensors.

Most special fibres, such as, for example, doped fibres for optical amplifiers, fibres for gratings or optical sensors typically have a limited length, e.g., lower than 1 km, preferably lower than 500 m and more preferably lower than 200 m.

Furthermore, special fibres such as, for example, doped fibres for optical amplifiers, dispersion compensating fibres, fibres for optical sensors of the above ones may have a high birefringence. The high birefringence of these fibres is typically due to a stress induced by their refractive index profile, that generally presents a higher core-cladding refractive index difference with respect to standard fibres for telecommunications. Typically, the numerical aperture NA of these fibres is higher than or equal to 0.2. The numerical aperture NA is defined, for step-index fibres, as $$NA = \sqrt{n_1^2 - n_2^2}$$

where $n_1$ and $n_2$ are, respectively, the refractive index of the core and the refractive index of the cladding. The beat length of these fibres is generally lower than 5 m.

Advantageously, the period p of the spin function may be chosen so as to be lower than the expected fibre beat length $L_B$. In this case, the inventors have found that the variability with respect to the fibre beat length of the spin function parameters useful for obtaining a substantially periodic DGD is further reduced.

A typical parameter of a periodic spin function is its amplitude: in general, the term "amplitude" will be referred to as the maximum spin rate α' reached by a spin function. Although the above method may be applied, in general, for determining any amplitude value of the spin function, the inventors have observed that it is particularly effective for amplitude values which are not eccessively high. Preferably, the amplitude should be less than 50 turns/m, more preferably less than 10 turns/m. In this respect, technological constraints of the currently available apparatus (such as, for example, a lowering of the bearing lifetimes) may limit the application of high amplitude spin functions to a fibre drawn at high speed. On the other hand, in order to have an effective result on the PMD of the optical fibre the amplitude of the spin function should be preferably higher than 0.1 turns/m. More preferably, the amplitude should be higher than 3 turns/m.

In general, another spin function parameter that is significant in the framework of the present invention is the ratio between the amplitude A and the period p of the spin function. In fact, spin functions having a small period p and a high amplitude value A may cause the spinning apparatus to work with very high acceleration values for long time, which is not desirable. In particular, some spin functions, such as for example amplitude modulated spin functions, may have regions in which the amplitude value greatly varies in a short distance (in the same way of a simple sinusoidal spin function having a very short period). Thus, a suitable parameter to be checked may be the ratio between the amplitude A (that is, the maximum amplitude value) reached between two inversion sites of the spin function (measured in turns/m) and the distance r between the same two inversion sites (measured in m). The inversion sites of the spin function are those points in which the spin function changes of sign, passing from negative values to positive values or viceversa. Preferably, the ratio A/r should be lower than 10 turns/M$^2$.

The inventors have also verified that the substantially periodic DGD evolution is substantially independent of the wavelength of a signal to be transmitted in the optical fibre. Thus, the feasibility of a wavelength division multiplexing system with the spun optical fibres according to the invention is ensured, since PMD limits on system performance may be strongly reduced.

The inventors have also found that conditions (11) and (12) for determining the optimum spin parameters can be much simplified by making some assumptions on the spin function α(z).

A first assumption is that the spinning period is shorter than the beat length, that is $p^2 \ll L_B^2$. Usually, in single mode fibres used in telecommunication systems the beat length is in the order of few tens of meters; further, a spinning period of few meters can be practically implemented. Hence, the condition $p^2 \ll L_B^2$ does not represent a significant limitation for this kind of fibres. As an example, a typical value of beat length of a single-mode step-index fibre can be around 20–25 meters (as measured at 1550 nm). In the following, condition $p^2 \ll L_B^2$ will be referred as "short period assumption". Such an assumption can be considered practically met if, e.g., $L_B \geq 3p$.

A second assumption is that the spin function α(z) contains only odd harmonics, that is, functions G(s) such that $$G(s) = -G(s+\chi/2)$$

where $\chi$ is the period of the function.

Figure 3:
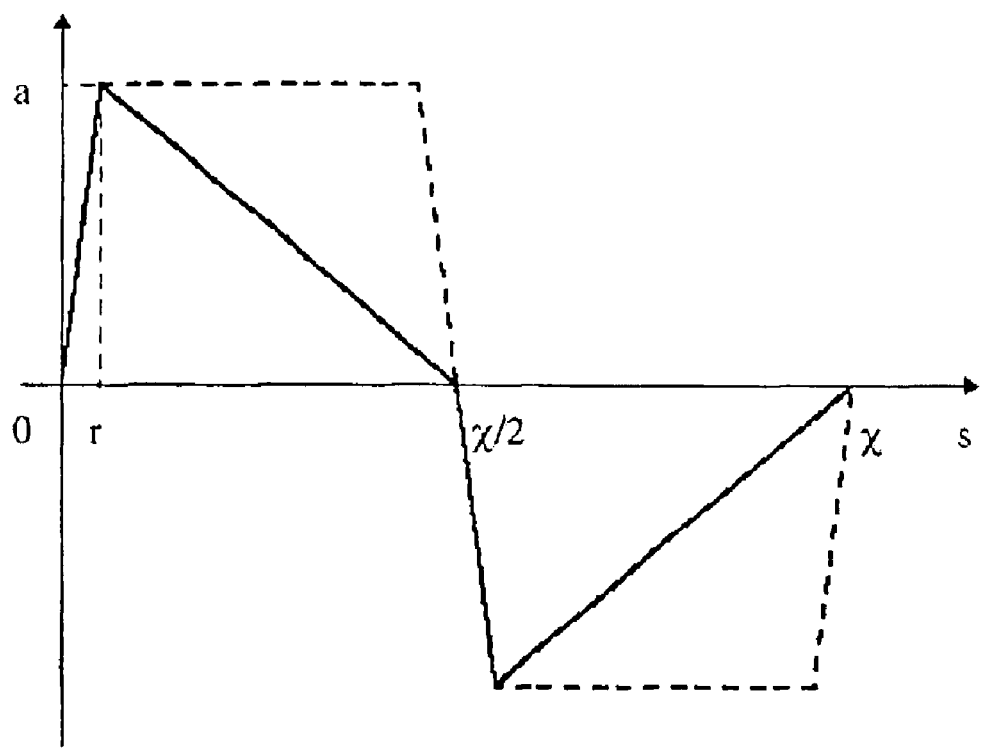
FIG. 3 schematically shows a triangular spin function (solid line) and a trapezoidal spin function (dashed line)

Examples of spin functions containing only odd harmonics are sinusoidal functions, triangular functions, trapezoidal functions (see FIG. 3).

The inventors have found that, under the two above mentioned assumptions, the DGD is periodic if the spin function satisfies the following condition, written in the adimensional reference frame above introduced, $$\frac{2}{\chi}\int_0^{\chi/2} \cos(G(s))\,ds = 0 \tag{13}$$

where $$G(s) = \int_0^s \gamma(s')\,ds'$$

Coming back to the previous reference frame (the same of the above equations (5) and (6)), equation (13) can be re-written as $$\frac{2}{p}\int_0^{p/2} \cos(2\alpha(z))\,dz = 0 \tag{13'}$$

where α(z) is the p-periodic spin function, expressed in radians. Condition (13') is actually a condition for setting the optimum parameters of the spin function, in order to obtain a periodic DGD evolution along the fibre.

Clearly, if the spin function depends on more than one parameter, then the method for determining the parameters of the spin function according to the above may be applied for determining only one parameter, the other parameters being predetermined independently. As an example, for a triangular spin function, that involves three parameters (see FIG. 3), one or even two parameters may fixed independently and the other parameter(s) can be determined with the above method.

Having defined the parameters of the spin function according to the above conditions, a reduction of the PMD coefficient of a single mode optical fibre can be obtained by spinning the fibre according to the spin function during the drawing process, that is, by applying the so determined spin function to the fibre. More specifically, this means heating a fibre preform to a conventional drawing temperature, and drawing the optical fibre from the preform such that the spin is imparted on the fibre. Preferably, the method involves rotation of the fibre, as opposed to the preform. Alternatively, although not preferred, rotation of the preform, either instead of, or in combination with, rotation of the fibre, can be performed if desired.

As it is evident to those skilled in the art, the spin function which is employed in practice involves varying the spin rate of the fibre as a function of time by applying appropriate forces to the fibre and/or the preform. Apparatus for applying such forces is discussed below. The temporal spin function applied to the fibre becomes translated into a spatial spin function in the fibre as the fibre is being drawn. This spatial spin function can be detected in the finished fibre by, for xample, examining spaced cross sections through the fibre. A method for ascertaining the existence of a frozen-in spin is described in Marrone et al., "*Internal rotation of the birefringence axes in polarization-holding fibers*", *Optics Letters*, Vol. 12, pages 60–62, 1987.

Any apparatus which is capable of spinning the fibre during the fibre drawing process may be used to carry out the method.

Figure 17:
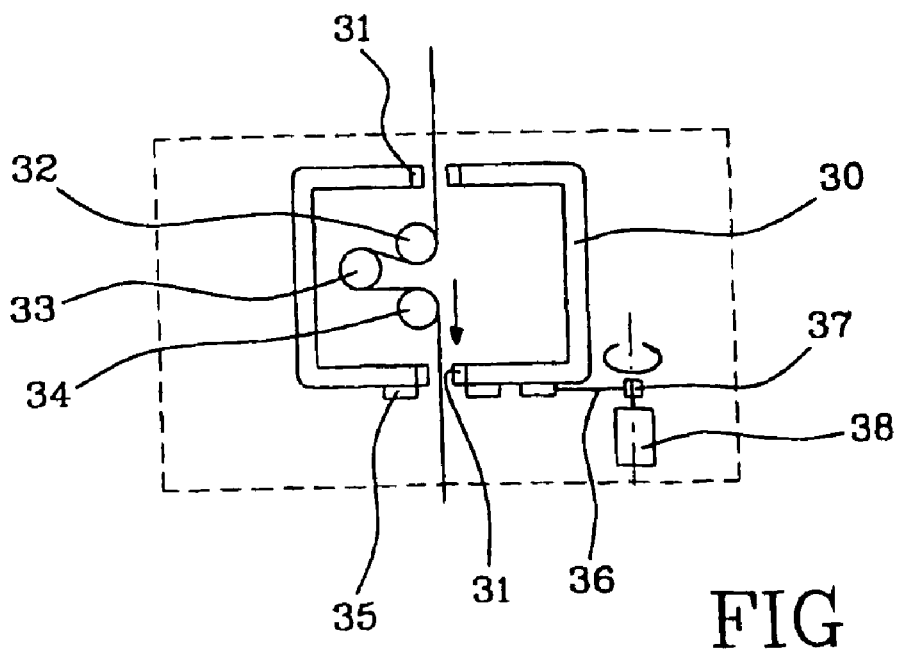
FIG. 17 schematically shows a preferred embodiment of an apparatus suitable for carrying out the application of the spin function to an optical fibre.

In a first preferred embodiment, shown in FIG. 17, the apparatus comprises a rotating hoop 30 mounted on two hollow bearings 31 which rotates about the fibre drawing axis. The rotating hoop 30 supports three pulleys 32, 33, 34 over which the fibre passes without sliding. The rotation of the hoop causes twisting of the fibre. Hoop 30 is driven by a belt 36 disposed between two notched pulleys, one (35) integral with the hoop and the other (37) integral with the shaft of a drive motor 38.

As a second example, WO patent application No. 99/67180, in the name of the Applicant, describes an apparatus in which the application of the torque to the fibre is carried out by means of one pulley which rotates about the fibre drawing axis and on which the fibre is wound up with an angle equal to 360°.

Other apparatus which can be used in the practice of the invention are described in the above mentioned U.S. Pat. No. 5,298,047.

In general terms, the spinning apparatus, however constructed, will include fibre-contacting means for applying a spinning force to a fibre, e.g., a roller, and drive means for moving the fibre-contacting means in a spatial pattern as a function of time, e.g., a computer-controlled drive motor and associated mechanical linkage for defining the motion of the fibre-contacting means. Typically, the spinning apparatus also comprises a feedback system for continuously monitoring the drawing speed or other drawing-related parameters and correcting the spin rate in case of variability of the same.

It has to be noticed that certain apparatus may not in all circumstances achieve a one-to-one correspondence between the spin function provided to the spinning apparatus and the resulting spin function in the fibre. However, the correspondence can be made in general good enough to achieve the benefits of the method and thus the invention can be defined in terms of the spin function employed during the drawing process even though the relative spin between the fibre and the preform, and thus the spin created in the fibre, may not correspond identically to the spin function provided to the spinning apparatus. Moreover, a possible lack in the above one-to-one correspondence can be taken into account, if needed, by suitably correcting the spin function provided to the spinning apparatus.

Figure 16:
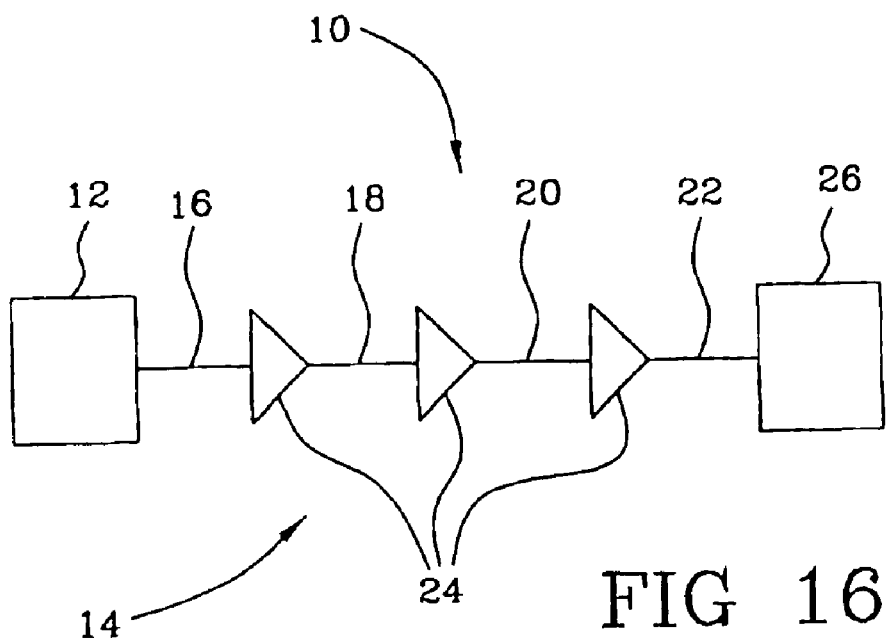
FIG. 16 schematically shows an optical telecommunication system.

A spun optical fibre with reduced PMD according to the invention may be used in an optical telecommunication system. The optical telecommunication system may be a high-speed optical telecommunication system includes a transmitting device for adding a signal to an optical transmission line. A receiver is provided to receive the signal from the transmitting device. An optical telecommunication system is illustrated in FIG. 16 and is generally designated by reference number 10. As illustrated in FIG. 16, the optical communications system 10 includes a transmitting device 12, a transmission line 14, and a receiving device 26. The length of the transmission line 14 (that is, the transmitter-to-receiver distance) is generally related to the kind of application thereof: it may be up to several tens of km for metropolitan and access networks, up to several hundreds of km for terrestrial systems, up to several thousands of km for submarine transoceanic systems.

Transmitting device 12 adds a signal to transmission line 14. Preferably, an operating wavelength of the transmitting device is comprised between 1520 nm and 1620 nm. Use of any device or combination of devices readily apparent to one skilled in the art to add the signal to the transmission line is contemplated. The transmitter 12 could include, for example, a DFB laser modulated directly or externally, e.g. with a Mach-Zehnder interferometer, or a combination of such devices in a WDM configuration. As well, transmitter 12 could comprise wavelength converters for receiving signal wavelengths from a separate transmission network and converting the carrier wavelengths to characteristic wavelengths in a conventional manner.

The optical communication system is capable of supporting any type of communication protocols for the transmitted signals, such as NRZ (non return to zero) or, RZ (return to zero), e.g., soliton-like, or CRZ (chirped return to zero). The system is not limited to a specific bit rate. However, the invention is particularly effective for bit-rates higher than or equal to 10 Gbit/s; more preferably, the bit-rate is higher than or equal to 40 Gbit/s.

The transmission line 14 includes at least one spun optical fiber according to the invention. As shown in FIG. 16, transmission line 14 includes a first span 16 and second span 18. In the exemplary embodiment, transmission line 14 may also include additional spans 20 and 22. Each span includes at least one single-mode fiber. The use of multiple fibers within each span to increase the signal carrying capacity of the transmission line is also contemplated. The multiple fibers can be bound together to form a cable.

As it is well known in the art, the fiber within each span 16, 18, 20 and 22 has a certain attenuation at the operating frequency. The cumulative attenuation of the signal over the transmission line accumulates as the signal travels through each span. Amplifiers 24 may be placed between the spans 16, 18, 20, and 22 to increase the power of the signal to account for the attenuation of the signal.

The amplifiers 24 may comprise optical amplifiers, such as erbium-doped fiber amplifiers or Raman amplifiers, for amplifying the signals within the preferred 1550 nm transmission window. As well, system 10 may include an optical add/drop multiplexer (OADM, not shown), for dropping or adding signals to system 10, particularly in a WDM configuration. OADM and amplifiers 24 may be of any type commonly known in the art. Finally, system 10 may include receiver 26 connected directly to optical fiber 22 or coupled to optical fiber 22 through other intermediate components. Receiver 26, as readily known in the field, may include a router, demultiplexer and the like, to assist with deciphering the information carried in the optical signals.

By the term "coupled", it is meant that two physical devices are joined by a common optical path and possibly, although not necessarily, physically adhered. Applicant uses the terms "coupled" and "connected" interchangeably in describing the invention, and those skilled in the art will appreciate that the various components identified herein need not be physically attached to each other to provide the optical coupling that assists in achieving the beneficial results of the invention.

Many articles can be fabricated based on spun optical fibres according to the invention. For example, optical components, such as fibre gratings, dispersion-compensating fibres, fibres for optical amplifiers and fibre lasers, patchcords, fibre couplers etc. These optical components can be used alone or in combinations with other components in optical devices, such as, for example, dispersion compensating modules including dispersion compensating fibres and/or fibre gratings, fibre amplifiers, fibre lasers, optical sensors etc. Spun optical fibres according to the invention may be also included in articles such as cables or ribbons.

EXAMPLES

1) As a first example, a sinusoidal spin rate function has been considered. This function has only odd harmonics. In the above introduced adimensional system, such spin rate function may be written as $$\gamma(s) = 2\gamma_1 \cos(\epsilon s)$$

and the corresponding integral function G(s) reads as $$G(s) = \int_0^s 2\gamma_1 \cos(\xi s') ds' = \frac{2\gamma_1}{\xi} \sin(\xi s)$$

Under the short period assumption, the DGD is periodic if the following condition is satisfied (see (13)):

$$\int_0^{\chi/2} \cos\left(\frac{2\gamma_1}{\xi} \sin(\xi s)\right) ds = \frac{2\pi}{\xi} J_0\left(\frac{2\gamma_1}{\xi}\right) = 0$$

where $J_0$ is the first kind Bessel function of order 0.

Figure 2:
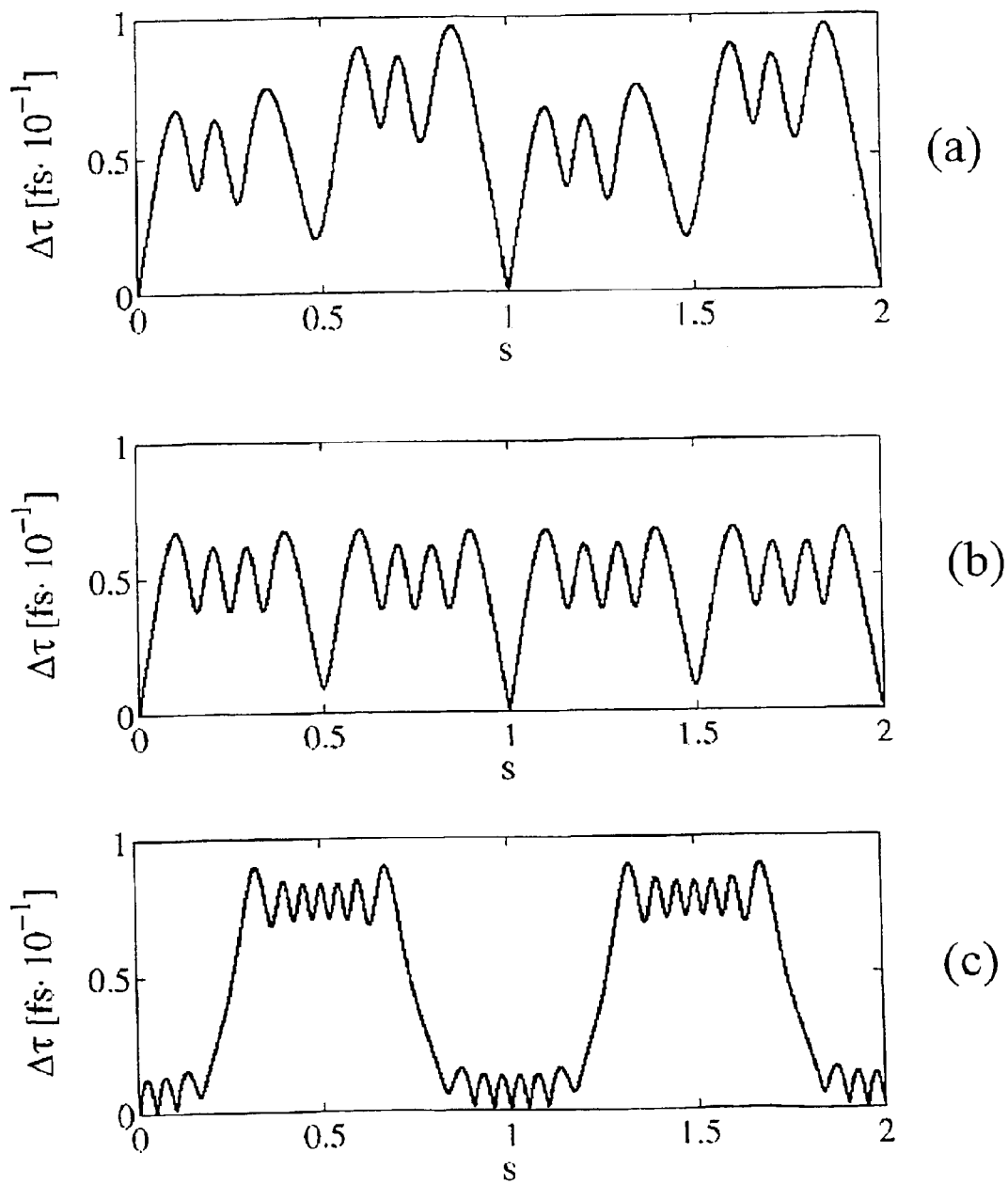
FIGS. 2a to 2c show an evaluation of the periodic evolution of the differential group delay in a short section of an optical fibre spinned with: a) an example of triangular spin function according to the invention; b) an example of trapezoidal spin function according to the invention; c) an example of sinusoidal spin function according to the invention.

Exemplarily, by setting $\xi = 2\pi$, a possible value $\gamma_1$ which can be found in order to satisfy the above condition is 37.05. By setting these parameters in the spin function and numerically solving equation (6), the periodic evolution of the PDV and of the DGD was verified, as it is shown, respectively, in FIG. 1 and FIG. 2(c). As analitically predicted, $\Omega_1$ has zero mean and, hence, $\Delta\tau$ is a periodic function of distance with the same period as $\Omega_1$. For the simulation, the fibre was represented by a series of waveplates in cascade, according to a model which is known in the art as "waveplate model", which is described, for example in Corsi et al., "*Analytical treatment of polarization dispersion in single-mode fibers by means of backscattering signal*" J. Opt. Soc. Am. A, vol. 16, pp. 574–583, 1999, or also in the already cited F. Curti et al, "*Statistical treatment of the evolution of the principal states of polarization in single-mode fibers*", IEEE J. Lightwave Tech., vol. 8, pp. 1162–1166, 1990.

2) As a second example, a triangular asymmetrical spin rate function (represented by the continuous line in FIG. 3) has been considered. This function has only odd harmonics. On the first half of the period it may be written as $$\gamma(s) = \begin{cases} \frac{a}{r} s; & 0 \leq s \leq r \\ \frac{a}{\chi - 2r}(-2s + \chi); & r \leq s \leq \frac{\chi}{2} \end{cases}$$

On the second half of the period an analogous expression can be written exploiting the symmetry properties. The meaning of the parameters a and r is explained in FIG. 3. The function G(s) results $$G(s) = \begin{cases} \frac{as^2}{2r}; & 0 \leq s \leq r \\ \frac{a(-2s^2 + 2\chi s - \chi r)}{2(\chi - 2r)}; & r \leq s \leq \frac{\chi}{2} \end{cases}$$

so from (13) it can be obtained $$\int_0^{\chi/2} \cos G(s) ds = \frac{1}{2\sqrt{a}} \left\{ 2\sqrt{\pi r} C\left(\sqrt{\frac{ar}{\pi}}\right) + \sqrt{2\pi(\chi - 2r)} \left[\cos\left(\frac{a\chi}{4}\right) C\left(\sqrt{\frac{a(\chi - 2r)}{2\pi}}\right) + \sin\left(\frac{a\chi}{4}\right) S\left(\sqrt{\frac{a(\chi - 2r)}{2\pi}}\right)\right] \right\}$$

$$= 0$$

where S and C are the Fresnel integrals defined as:

$$S(z) = \int_0^\chi \cos\left(\frac{\pi}{2}t^2\right)dt, \qquad C(z) = \int_0^\chi \sin\left(\frac{\pi}{2}t^2\right)dt$$

Figure 4:
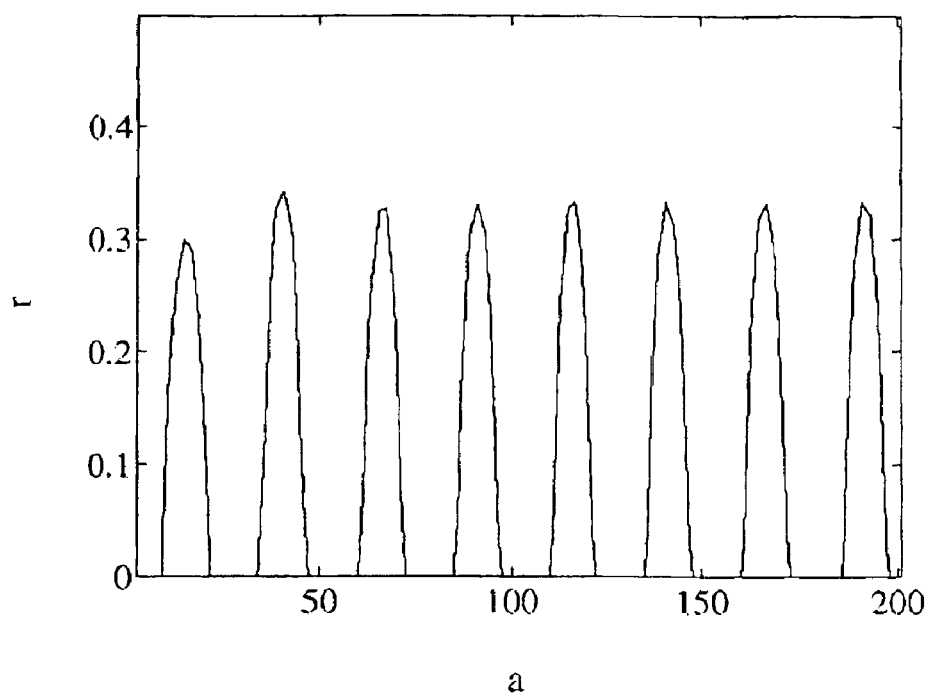
FIG. 4 shows the combinations of parameters (a,r) of an exemplary triangular spin function that lead to a periodic DGD.

The locus of (a,r) values that satisfy the above equation is shown in FIG. 4. As for the sinusoidal spin function profile, by numerical simulations (using the waveplate model) the periodic evolution of the DGD with these parameters was verified. As an example, in FIG. 2(a) the periodic DGD is reported for the couple (a, r)=(69.14, 0.164), with a period χ=1.

3) As a third example, a trapezoidal spin rate function (represented by the dashed line in FIG. 3) has been considered. This function has only odd harmonics. On the first half of the period it may be written as $$\gamma(s) = \begin{cases} \dfrac{a}{r}s; & 0 \leq s \leq r \\ a; & r \leq s \leq \dfrac{\chi}{2} - r \\ -\dfrac{a}{r}s + \dfrac{a\chi}{2r}; & \dfrac{\chi}{2} - r \leq s \leq \dfrac{\chi}{2} \end{cases}$$

Figure 5:
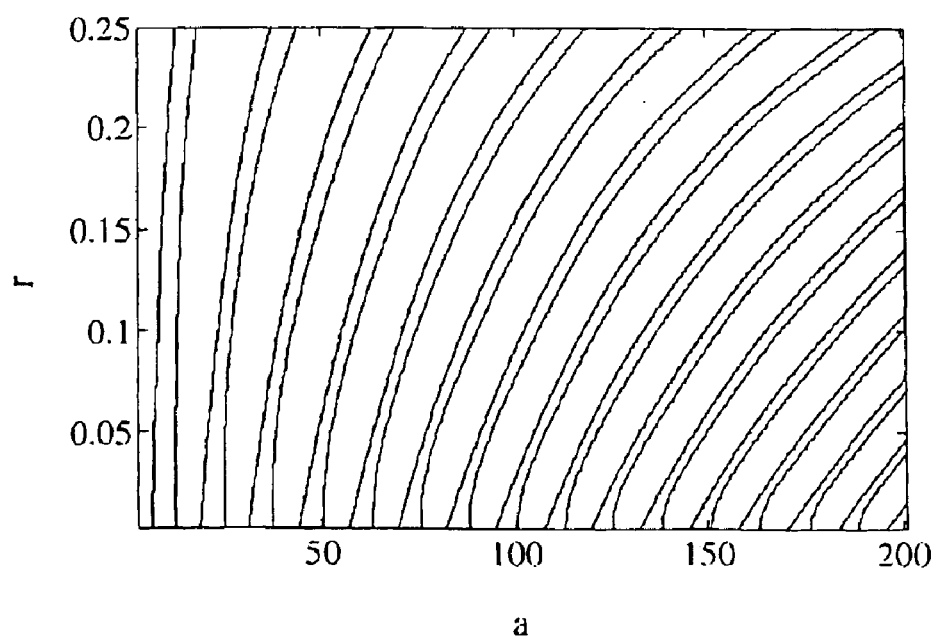
FIG. 5 shows the combinations of parameters (a,r) of an exemplary trapezoidal spin function that lead to a periodic DGD.

On the second half of the period an analogous expression can be carried out exploiting the symmetry properties. Parameters a and r are explained in FIG. 3. The corresponding spin function G(s) is $$G(s) = \begin{cases} \dfrac{as^2}{2r}; & 0 \leq s \leq r, \\ a\left(s - \dfrac{r}{2}\right); & r \leq s \leq \dfrac{\chi}{2} - r, \\ a\dfrac{4s\chi - 4s^2 + 4\chi r - \chi^2 - 8r^2}{8r}; & \dfrac{\chi}{2} - r \leq s \leq \dfrac{\chi}{2} \end{cases}$$

so from (13) it can be obtained $$\int_0^{\chi/2} \cos G(s)\,ds = \frac{1}{a}\left\{-\sin\left(\frac{ar}{2}\right) + \sin\left(\frac{a(\chi - 3r)}{2}\right) + \right.$$

$$\sqrt{ar\pi}\left[\left(-1 - \cos\left(\frac{a(\chi - 2r)}{2}\right)\right)C\left(-\sqrt{\frac{ar}{\pi}}\right) - \right.$$

$$\left.\left.\sin\left(\frac{a(\chi - 2r)}{2}\right)S\left(-\sqrt{\frac{ar}{\pi}}\right)\right]\right\}$$

$$= 0$$

where S and C are again the Fresnel integrals. The locus of (a, r) values that satisfy the above equation is shown in FIG. 5. As for the previous examples, by numerical simulations (using the waveplate model) the periodic evolution of the DGD with these parameters was verified. As an example, in FIG. 2(b) the periodic DGD is reported for the couple (a, r)=(70.26, 0.164), with a period χ=1.

4) As a fourth example, the stability towards variations of the parameters of a sinusoidal spin rate function was investigated. When the fibre is spun during drawing, in fact, the effective spinning parameters may differ from the theoretical ones due to technological limits. The considered spin rate function was the same given in the first example, which can be expressed in a dimensional form as $$\alpha'(z) = \frac{\gamma_1}{\xi}\frac{2\pi}{p}\cos\left(\frac{2\pi}{p}z\right) \text{ [rad/m]}$$

where $\xi = L_B/p$. Thus, the spin function reads as $$\alpha(z) = \frac{\gamma_1}{\xi}\sin\left(\frac{2\pi}{p}z\right) \text{ [rad]}$$

It has to be noticed that the amplitude of the spin function is simply $a = \gamma_1/\xi$. Generally speaking, since $\xi = L_B/p$, the optimum spin depends on the fibre beat length. However, under the short period assumption the solutions are independent on $L_B$, since the condition for a periodic DGD is determined by $J_0(2a)=0$, as seen before. This means that, under the short period assumption, the only constraint is on the parameter a, while p and $L_B$ can assume any value.

Figure 6:
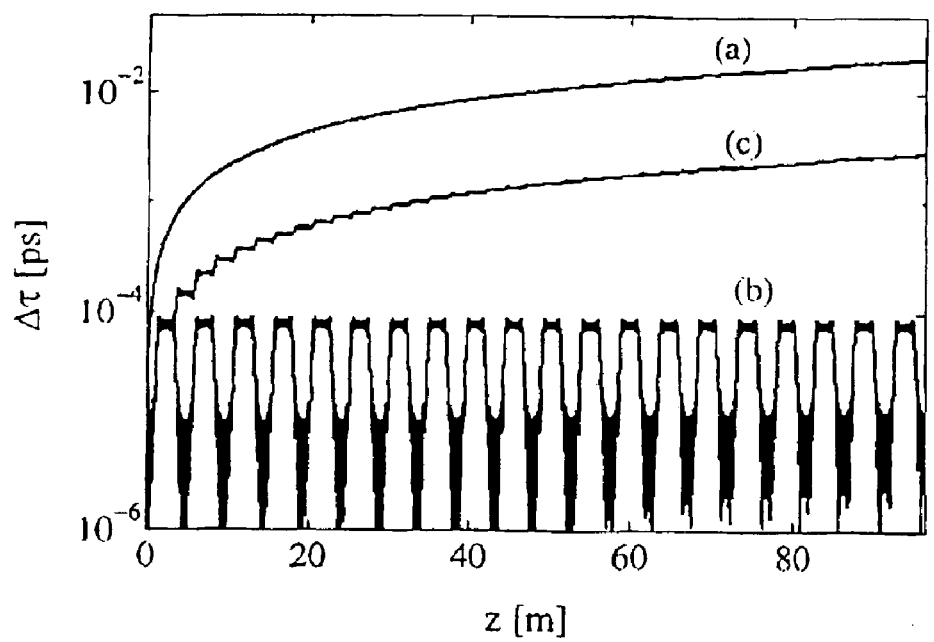
FIG. 6 shows a plot of the DGD in a short section of: (a) an unspun optical fibre; (b) an optical fibre spinned with a spin function according to the invention; (c) an optical fibre spinned with an un-optimized spin function.

The above condition $J_0(2a)=0$ is satisfied by a countable infinity of solutions. Reasonably, the sinusoidal spin function being least effective in reducing DGD ("worst case spinning") could be expected when a is the mean value between two successive solutions of the above condition; indeed this was confirmed by numerical simulations. FIG. 6 shows the DGD evolutions along an unspun fibre (line (a)), along the same fibre spun with an optimum spinning (line (b)) and with the worst case spinning (line (c)). Simulations (using the waveplate model) were performed with $\xi=5$ and $L_B=24$ m (which is a typical value for standard step-index fibres), hence the period was p=4.8 m. The spin amplitude was 16.886 (a/p=3.52 turns/m) for the optimum spinning and a=16.1 (a/p=3.35 turns/m) for the worst spinning. As it can be seen, the optimum spinning gives a periodic DGD, while in the worst case $\Delta\tau(z)$ is no more periodic, however being one order of magnitude lower than the DGD of the unspun fibre.

5) As a fifth example, the stability towards random coupling was investigated. Real telecommunications fibres are, in fact, unavoidably affected by random coupling, due to random birefringence, which has to be taken into account. The effect of random coupling was studied by the inventors by supposing the fibre to be affected by linear birefringence. See P. K. A. Way et al., "*Polarization mode dispersion, decorrelation, and diffusion in optical fibers with randomly varying birefringence*". IEEE J. Lightwave Tech., vol. 14., pp. 148–157, 1996; F. Corsi et al, "*Beat-length characterization based on backscattering analysis in randomly perturbed single-mode fibers*", IEEE J. Lightwave Tech., vol. 17, pp. 1172–1173, 1999. Moreover, the local birefringence of the unspun fibre was described by the differential equation $$\frac{d\beta_i}{dz} = -\rho\beta_i(z) + \sigma\eta_i(z), \, i = 1, 2$$

where $\eta_1$ and $\eta_2$ are white-noise, gaussian-distributed, statistically independent processes, with zero mean value and unitary standard deviation. The parameters ρ and σ describe the statistical properties of $\beta_i(z)$: in particular, ρ is related to the correlation length of the birefringence $L_F$ ($L_F=1/\rho$), whereas σ is also related to the beat length $L_B$ ($L_B=4\sqrt{2\pi}\rho/\sigma^2$).

Figure 7:
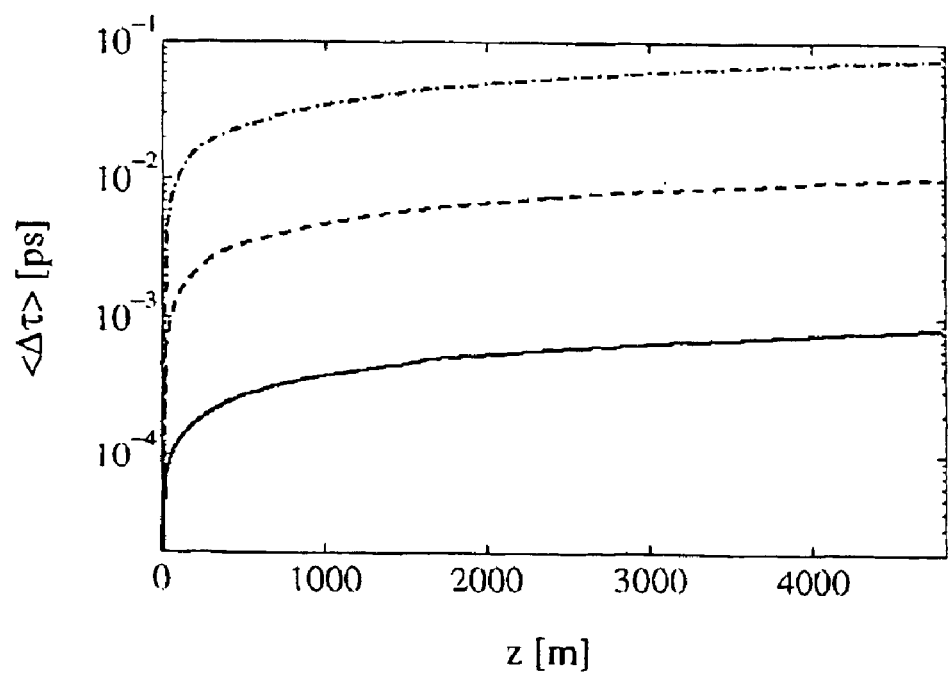
FIG. 7 shows a plot of the DGD along few kilometers of: an unspun optical fibre (dashed-dotted line); an optical fibre spinned with a spin function according to the invention (solid line); an optical fibre spinned with an un-optimized spin function (dashed line)

For the simulation, $L_B$ was set to 24 m and $L_F$ was set to 15 m; the DGD evolution was studied with the sinusoidal spin function of the fourth example in the optimum spinning case (p=4.8 m, a=16.886), in the worst spinning case (p=4.8 m, a=16.1) and for the unspun fibre. The simulated DGD has been averaged over a set of 1000 fibres, 5 km long and made up of 20000 waveplates in cascade. The resulting evolution is reported in FIG. 7. As it can be seen, with respect to the unspun fibre (dash-dotted line) the DGD was reduced of one ord r of magnitude in case of worst spinning (dashed line), whereas in case of optimum spinning the same was reduced of two orders of magnitude.

6) As a sixth example, the inventors have calculated the evolution of the integral functions $I_1$, $I_2$ above defined, for a first sinusoidal spin rate function having period equal to 5 m. The spin rate function (measured in turns/m) was $$\alpha'(z) = A\cos\left(\frac{2\pi}{5}z\right)$$

and the evolution of the integral functions $I_1$, $I_2$ was evaluated in dependence of the amplitude A (measured in turns/m)

The beat length $L_B$ was set to 25 m.

Figure 8:
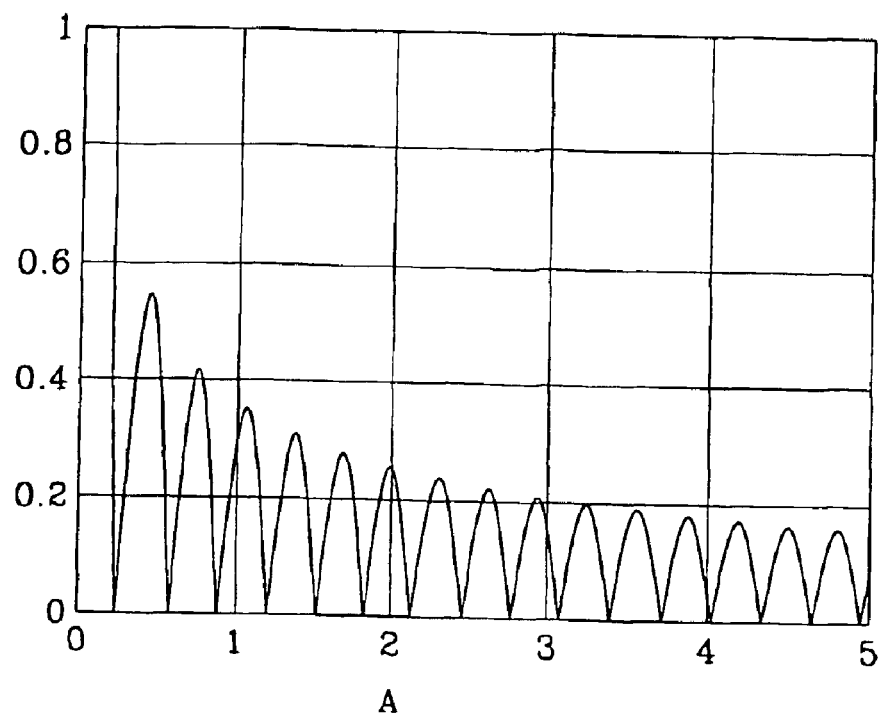
FIG. 8 shows the evolution of a function $I_1$ (defined in the description below) versus the amplitude of a first example of spin function.
Figure 9:
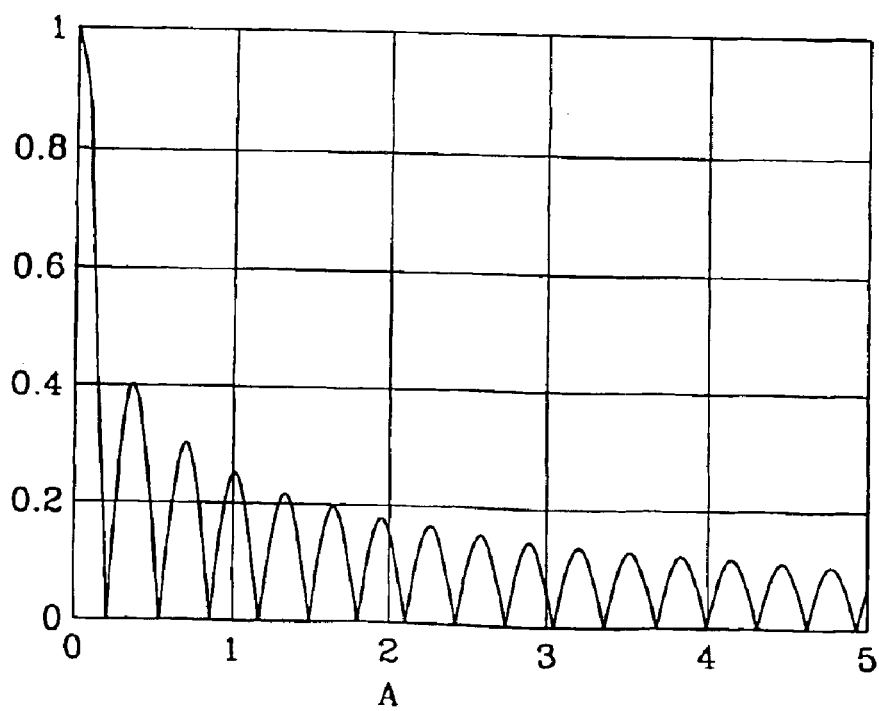
FIG. 9 shows the evolution of a function $I_2$ (defined in the description below) versus the amplitude of the same function of FIG. 8.

The results of the simulation is reported, in FIG. 8 and FIG. 9. As it can be seen from FIG. 8, values of the integral function $I_1$ very close to zero are reached in correspondence of the well defined minima of the plotted function, which correspond to well defined amplitude values. As it can be seen from FIG. 9, substantially in correspondence of the same values of amplitude, also the second integral function $I_2$ reaches a minimum value.

7) As a seventh example, the inventors have calculated the evolution of the integral functions $I_1$, $I_2$ above defined, for a second sinusoidal spin rate function having period equal to 15 m. The spin rate function (measured in turns/m) was $$\alpha'(z) = A\cos\left(\frac{2\pi}{15}z\right) + \sin\left(\frac{2\pi}{15}z\right)$$

and the evolution of the integral functions $I_1$, $I_2$ was evaluated in dependance of the amplitude A.

The beat length $L_B$ was set to 15 m.

Figure 10:
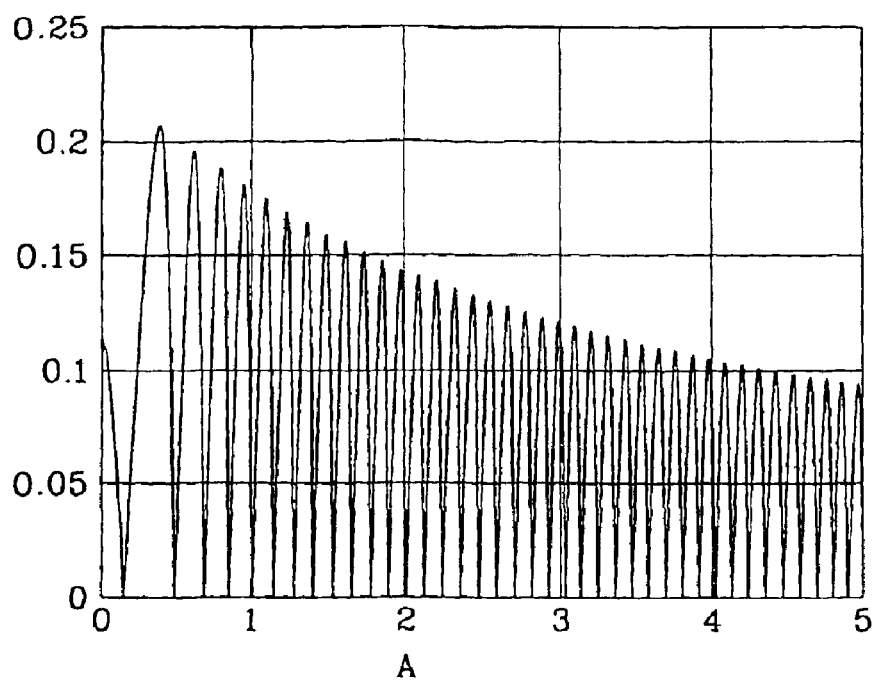
FIG. 10 shows the evolution of the function $I_1$, versus the amplitude of a second example of spin function.
Figure 11:
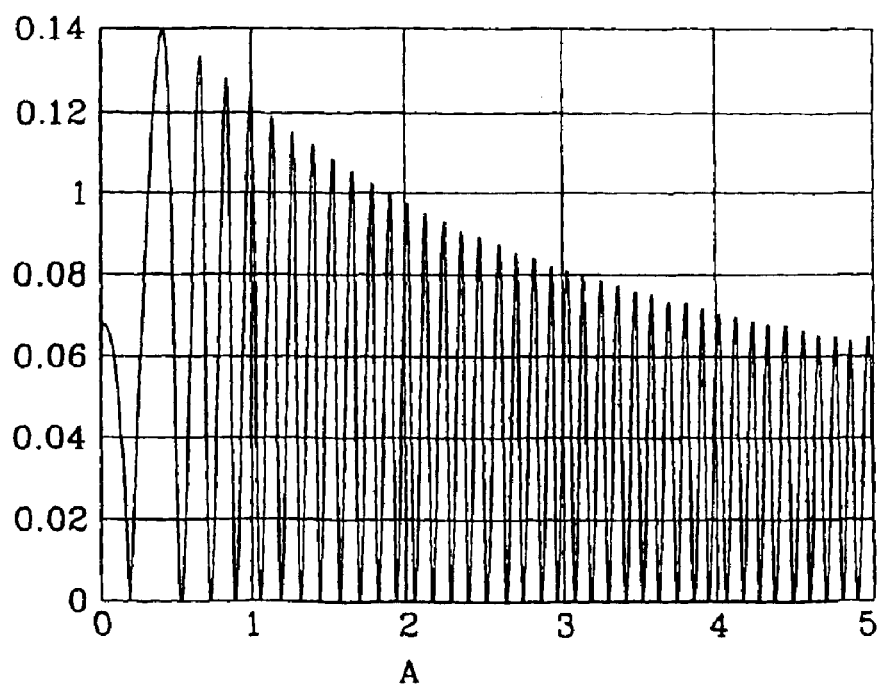
FIG. 11 shows the evolution of the function $I_2$ versus the amplitude of the same function of FIG. 10.

The results of the simulation is reported, in FIG. 10 and FIG. 11. As it can be seen from FIG. 10, values of the integral function $I_1$ very close to zero are reached in correspondence of the well defined minima of the plotted function, which correspond to well defined amplitude values. As it can be seen from FIG. 11, substantially in correspondence of the same values of amplitude, also the second integral functions $I_2$ reaches a minimum value.

Figure 12:
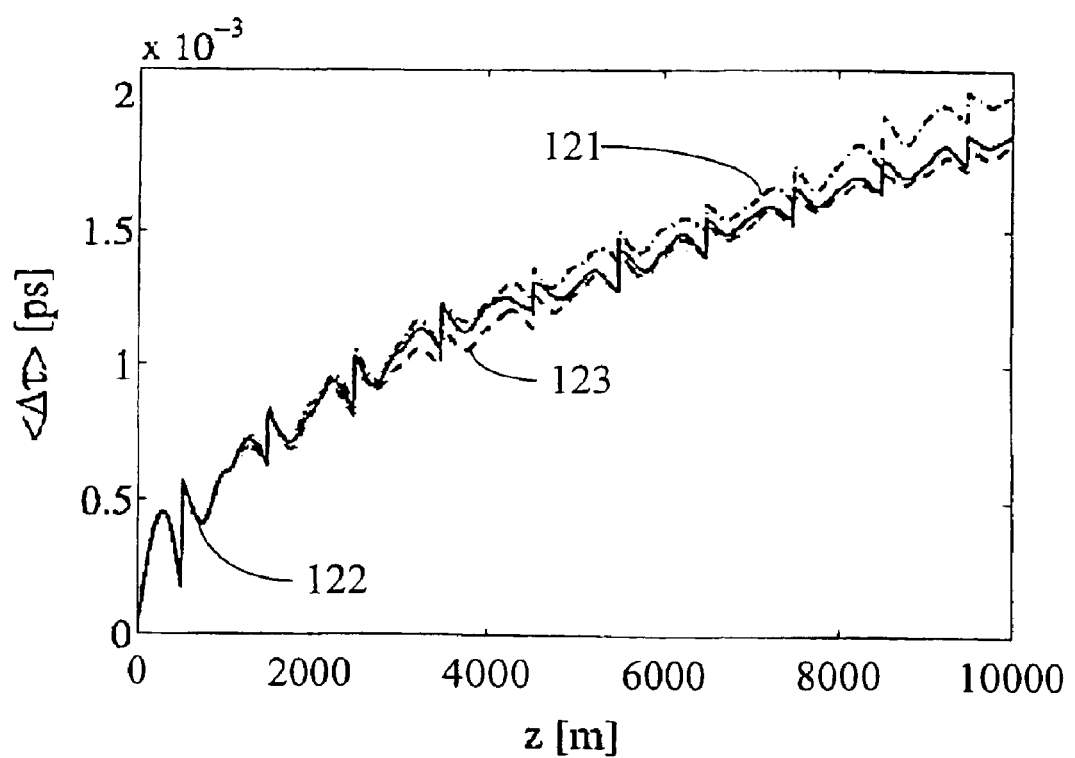
FIG. 12 shows a plot of the evolution of the DGD along 10 km of an optical fibre spinned with an exemplary spin function according to the invention, for optical signals having different wavelengths.

8) As an eighth example, the inventors have analyzed the effects of the wavelength variation on the DGD evolution, so as to realize the feasibility of wavelength division multiplexing systems. They used a range of 12 nm between 1548 and 1560 nm. A sinusoidal spin function with optimized parameters was considered. The simulated DGD has been averaged over a set of 500 fibres, 10 km long and made up of 20000 waveplates in cascade. A random variation of the birefringence was obtained through random rotations (in the range $-\pi,\pi$) of the birefringence axis every 500 m. The resulting DGD as a function of length is shown in FIG. 12. As it can be seen, there is no substantial difference between the DGD evolution for a signal of 1548 nm (dash-dotted line 121), of 1556 nm (solid line 122), of 1560 nm (dashed line 123).

9) As a ninth example, the inventors have studied the DGD evolution along different optical fibres spun with a series of trapezoidal spin functions. They also obtained the PMD coefficient of the fibres, averaging, for each case, the DGD behaviour of a population of 800 fibres using the waveplate model. A trapezoidal spin function can be described by means of three parameters (see FIG. 3): amplitude A, rate r and period $\chi$. The tested trapezoidal functions spin differed only by the amplitude value. The rate r was set to 1.5 m. The period $\chi$ was set to 8 m. The beat length of the fibres was set to 20 m. The following table 1 resumes the amplitude values used for the simulations, together with the values assumed by the integral functions $I_1$ and $I_2$ with the related spin function and the PMD coefficient of the corresponding spun optical fibre. The values of the obtained PMD coefficients may be compared with the PMD coefficient of an unspun optical fibre having a beat length of 20 m, that was estimated to be 0.09 $ps/km^{1/2}$ by using the waveplate model.

TABLE 1

| A (turns/m) | $I_1$ | $I_2$ | $PMD_c$ ($ps/km^{1/2}$) |
|---|---|---|---|
| 2.100 | 0.17 | 0.10 | $8.8 \cdot 10^{-3}$ |
| 2.149 | $1.5 \cdot 10^{-3}$ | $9.3 \cdot 10^{-4}$ | $6.0 \cdot 10^{-4}$ |
| 2.145 | $1.4 \cdot 10^{-2}$ | $8.3 \cdot 10^{-3}$ | $6.6 \cdot 10^{-4}$ |

The advantageous result obtained with the parameters according to the invention is evident from table 1. The trapezoidal spin functions having amplitude values of 2.149 and 2.145 turns/m allow to obtain a PMD coefficient of more than one order of magnitude with respect to the trapezoidal spin function having amplitude value of 2.100 turns/m and more than two orders of magnitude with respect to the unspun case.

Figure 13:
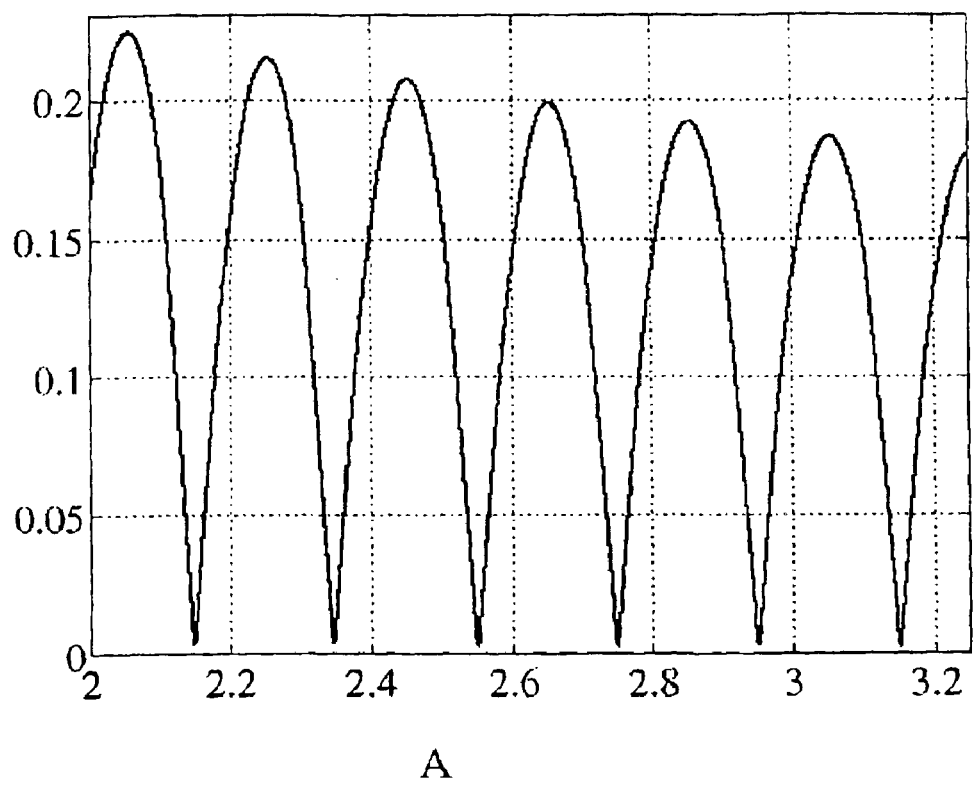
FIG. 13 shows a plot of the evolution of the function $I_1$ versus the amplitude of a trapezoidal spin function, in a range of amplitudes comprised between 2 turns/m and about 3.2 turns/m.

FIG. 13 shows a plot of the integral function $I_1$ versus the amplitude of the series of trapezoidal spin functions, in a range comprised between 2 turns/m and about 3.2 turns/m. As it can be seen, a value of amplitude of 2.149 turns/m is near the first mimimum in FIG. 13, whereas a value of amplitude of 2.100 turns/m is not far from the nearest local maximum.

Figure 14:
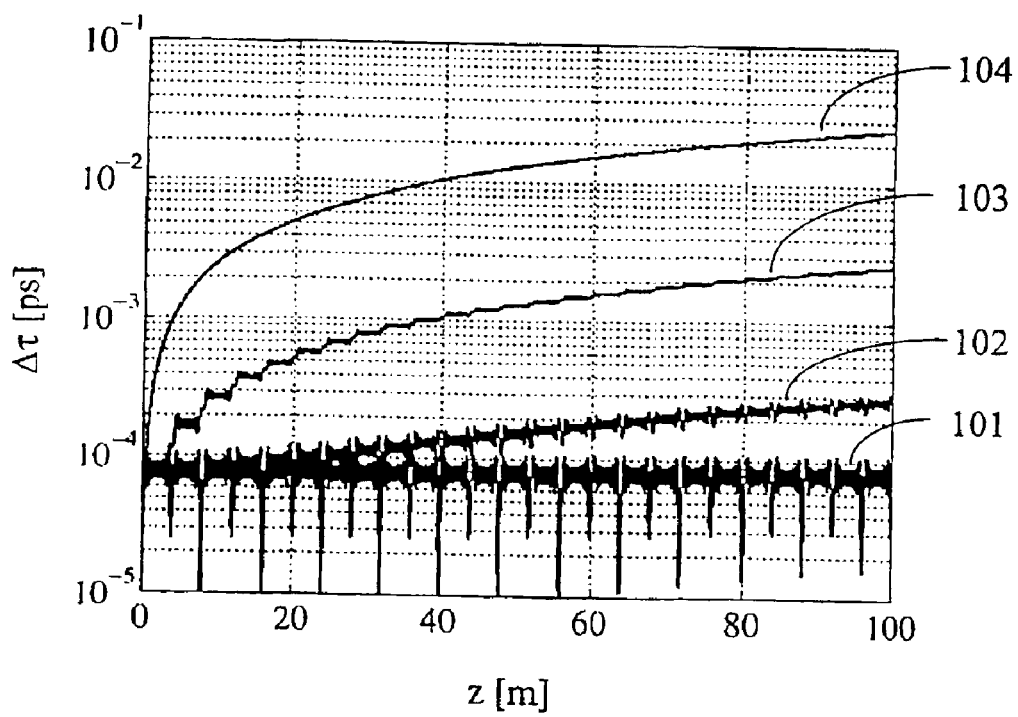
FIG. 14 shows plots of the DGD evolution along 100 m of optical fibres spun with exemplary trapezoidal spin functions having amplitude of 2.149 turns/m (curve 101), 2.145 turns/m (curve 102), 2.100 turns/m (curve 103) and along an unspun optical fibre (curve 104)

FIG. 14 shows a plot of the DGD evolution along 100 m of the optical fibres spun with the series of trapezoidal functions according to table 1. It has to be noted that the vertical scale is a logarithmic scale. Curve 101 refers to a fibre spun with a trapezoidal function having A=2.149 turns/m; curve 102 refers to a fibre spun with a trapezoidal function having A=2.145 turns/m; curve 103 refers to a fibre spun with a trapezoidal function having A=2.100 turns/m; curve 104 refers to an unspun fibre. As it can be seen, curve 101 shows a periodic DGD. Curve 102 shows a slightly growing DGD with respect to the previous one, but it has to be noted that the difference between the two curves is "amplified" by the logarithmic scale. By comparing curve 102 with curve 103, relative to the "un-optimized" spin function, it can be understood that the DGD evolution shown by curve 102 is actually substantially periodic.

Figure 15:
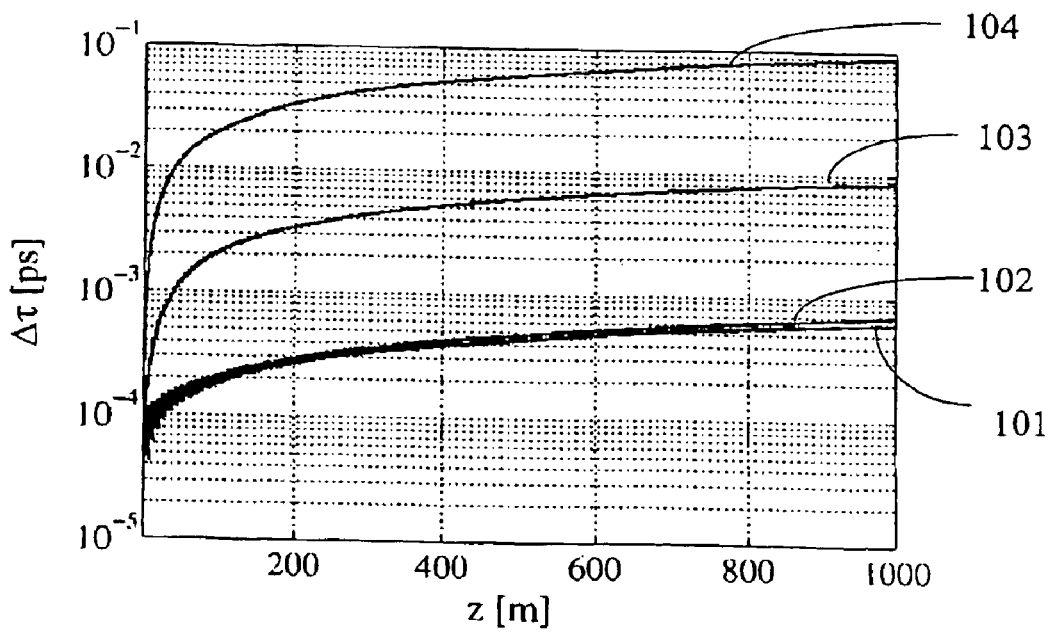
FIG. 15 shows plots of the DGD evolution along 1 km of the same optical fibres of FIG. 14.

FIG. 15 shows a plot of the DGD evolution along 1 km of the same optical fibres of FIG. 14, obtained with the waveplate model. The same reference numbers are used for identifying the same spun fibres of FIG. 14. The vertical scale is still logarithmic. As it can be seen, there is no practical difference between the curves 101 and 102, thus confirming that curve 102 corresponds to a substantially periodic DGD evolution. The values of PMD coefficient reported in the above table 1 were obtained by FIG. 15, by taking the value of DGD corresponding to z=1000 m.

What is claimed is:

1. A method for determining at least one parameter of a periodic spin function $\alpha(z)$ with period p, to be applied to an optical fibre along its length z, comprising:

selecting said at least one parameter so that $$\frac{\left|\int_0^p y_1(z, \alpha'(z))dz\right|}{\int_0^p |y_1(z, \alpha'(z))|dz} \leq \varepsilon_1$$

where $\varepsilon_1$ is about 0.05 and $y_1$ is the first of the three components $y_1(z)$, $y_2(z)$, $y_3(z)$ of a periodic function $\bar{y}(z)$ of a period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

where $L_B$ is an expected beat length of said optical fibre and $\alpha'(z)$ is the derivative of the spin function $\alpha(z)$ with respect to the length z.

2. A method for making an optical fibre comprising:
   (a) heating a fibre preform to a drawing temperature;
   (b) providing a periodic spin function $\alpha(z)$ with period p>2 m; and
   (c) drawing said optical fibre from said preform, while simultaneously creating a relative spin between said optical fibre and said preform with said spin function; step (b) further comprising selecting said spin function so that $$\frac{\left|\int_0^p y_1(z, \alpha'(z))dz\right|}{\int_0^p |y_1(z, \alpha'(z))|dz} \leq \varepsilon_1$$

where $\varepsilon_1$ is about 0.05 and y is the first of the three components $y_1(z)$, $y_2(z)$, $y_3(z)$ of a periodic function $\bar{y}(z)$ of period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

where $L_B$ is an expected beat length of said optical fibre and $\alpha'(z)$ is the derivative of the spin function $\alpha(z)$ with respect to the length z.

3. A method as in claim 2, wherein p is lower than 20 m.
4. A method as in claim 2, wherein $L_B$ is greater than 0.5 m.
5. A method as in claim 4, wherein $L_B$ is greater than 5 m.
6. A method as in claim 2, wherein an amplitude A of said spin function is lower than 50 turns/m.
7. A method as in claim 6, wherein A is lower than 10 turns/m.
8. A method as in claim 6, wherein A is greater than 3 turns/m.
9. A method as in claim 6, wherein a ratio between an amplitude A and a distance r between two inversion sites of said spin function is lower than 10 turns/m².
10. A method as in claim 2, wherein said step of drawing is performed at a drawing speed not lower than 5 m/s.
11. A method for making an optical fibre having NA≧0.2 comprising:

(a) heating a fibre preform to a drawing temperature;
   (b) providing a periodic spin function $\alpha(z)$ with period p; and
   (c) drawing said optical fibre from said preform, while simultaneously creating a relative spin between said optical fibre and said preform with said spin function;
   step (b) further comprising selecting said spin function so that $$\frac{\left|\int_0^p y_1(z, \alpha'(z))dz\right|}{\int_0^p |y_1(z, \alpha'(z))|dz} \leq \varepsilon_1$$

where $\varepsilon_1$ is about 0.05 and $y_1$ is the first of the three components $y_1(z)$, $y_2(z)$, $y_3(z)$ of a periodic function $\bar{y}(z)$ of period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

where $L_B$ is an expected beat length of said optical fibre and $\alpha'(z)$ is the derivative of the spin function $\alpha(z)$ with respect to the length z.

12. A method as in claim 11, wherein $L_B$ is lower than 5 m.
13. A method as in claims 1, 2 or 11, wherein p<$L_B$.
14. A method as in claims 1, 2, or 11, wherein $\varepsilon_1$ is about 0.01.
15. A method as in claim 14, wherein $\varepsilon_1$ is about 0.008.
16. A method as in claim 15, wherein $\varepsilon_1$ is about 0.002.
17. A method as in claims 1, 2 or 11, wherein said spin function is a sinusoidal function.
18. A method as in claims 1, 2 or 11, wherein said spin function is a triangular function.
19. A method as in claims 1, 2 or 11, wherein said spin function is a trapezoidal function.
20. An optical fibre comprising at least a section having a beat length $L_B$ and a periodic spin function $\alpha(z)$ with period p>2 m impressed therein, said spin function being such that $$\frac{\left|\int_0^p y_1(z, \alpha'(z))dz\right|}{\int_0^p |y_1(z, \alpha'(z))|dz} \leq \varepsilon_1$$

where $\varepsilon_1$ is about 0.05 and $y_1$ is the first of the three components $y_1(z)$, $y_2(z)$, $y_3(Z)$ of a periodic function $\bar{y}(z)$ of period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

and $\alpha'(z)$ is the derivative of the spin function $\alpha(z)$ with respect to the length z.

21. An optical fibre as in claim 20, wherein said optical fibre has a PMD coefficient, and said PMD coefficient is lower than or equal to 0.05 ps/km$^{1/2}$.

22. An optical fibre as in claim 20, wherein a length of said section of optical fibre is higher than or equal to 10 times the period p of the spin function.

23. An optical fibre having NA≧0.2, comprising at least a section having a beat length $L_B$ and a periodic spin function α(z) with period p impressed therein, said spin function being such that $$\frac{\left| \int_0^p y_1(z, \alpha'(z)) dz \right|}{\int_0^p |y_1(z, \alpha'(z))| dz} \leq \varepsilon_1$$

where $\varepsilon_1$ is about 0.05 and $y_1$ is the first of the three components $y_1(z)$, $y_2(z)$, $y_3(z)$ of a periodic function $\bar{y}(z)$ of period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

and α'(z) is the derivative of the spin function α(z) with respect to the length z.

24. An optical fibre having a length tower than 1 km, comprising at least a section having a beat length $L_B$ and a periodic spin function α(z) with period p impressed therein, said spin function being such that $$\frac{\left| \int_0^p y_1(z, \alpha'(z)) dz \right|}{\int_0^p |y_1(z, \alpha'(z))| dz} \leq \varepsilon_1$$

where $\varepsilon_1$ is about 0.05 and $y_1$ is the first of the three components $y_1(z)$, $y_2(z)$, $y_3(z)$ of a periodic function $\bar{y}(z)$ of period p such that $$\frac{dy_1}{dz} = 2\alpha'(z)y_2$$

$$\frac{dy_2}{dz} = -\frac{2\pi}{L_B}y_3 - 2\alpha'(z)y_1$$

$$\frac{dy_3}{dz} = \frac{2\pi}{L_B}y_2$$

and α'(z) is the derivative of the spin function α(z) with respect to the length z.

25. An optical fibre as in claim 24, wherein said fibre length is lower than 500 m.

26. An optical fibre as in claim 24, wherein said fibre length is lower than 200 m.

27. An optical telecommunication system comprising:
   an optical transmission line;
   at least one transmitter for adding a signal to said transmission line; and
   at least one receiver for receiving said signal from said transmission line;
   said transmission line comprising at least one optical fibre according to any one of claims 20 to 26.

28. An article comprising at least one optical fibre according to any one of claims 20 to 26.

\* \* \* \* \*